US012774218B2

(12) United States Patent
Zhang et al.

(10) Patent No.: US 12,774,218 B2
(45) Date of Patent: Oct. 27, 2026

(54) POSITIVE ELECTRODE MATERIAL, PREPARATION METHOD OF SAME, POSITIVE ELECTRODE PLATE, SECONDARY BATTERY, AND ELECTRICAL DEVICE

(71) Applicant: CONTEMPORARY AMPEREX TECHNOLOGY (HONG KONG) LIMITED, Hong Kong (CN)

(72) Inventors: Qiyu Zhang, Ningde (CN); Qi Wu, Ningde (CN); Qiang Chen, Ningde (CN); Chongheng Shen, Ningde (CN); Na Liu, Ningde (CN); Jingpeng Fan, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/174,563

(22) Filed: Apr. 9, 2025

(65) Prior Publication Data

US 2025/0236537 A1 Jul. 24, 2025

Related U.S. Application Data

(63) Continuation of application No. PCT/CN2023/074231, filed on Feb. 2, 2023.

(51) Int. Cl.
*C01G 53/506* (2025.01)

(52) U.S. Cl.
CPC ........ *C01G 53/506* (2025.01); *C01P 2004/03* (2013.01); *C01P 2004/53* (2013.01);
(Continued)

(58) Field of Classification Search
CPC ............... C01G 53/506; C01P 2004/03; C01P 2004/53; C01P 2004/61; C01P 2004/62;
(Continued)

(56) References Cited

U.S. PATENT DOCUMENTS

2019/0245199 A1* 8/2019 Zeng ..................... H01M 4/505
2021/0367233 A1 11/2021 Yongqing et al.
(Continued)

FOREIGN PATENT DOCUMENTS

CN 110010889 A 7/2019
CN 110858643 A * 3/2020 ........ H01M 10/0525
(Continued)

OTHER PUBLICATIONS

International Search Report dated Sep. 22, 2023 for application PCT/CN2023/074231.
(Continued)

*Primary Examiner* — Daniel S Gatewood
(74) *Attorney, Agent, or Firm* — Ladas & Parry LLP

(57) ABSTRACT

A positive electrode material, a preparation method of same, a positive electrode plate, a secondary battery, and an electrical device are described. The positive electrode material includes a ternary positive electrode substrate and optionally a coating layer. The coating layer coats a surface of the ternary positive electrode substrate. The ternary positive electrode substrate includes Li, Ni, Al, and an M element. The M element includes a combination of one or more of Mn, Co, Ti, Zr, W, Nb, Mo, Si, Mg, B, Cr, or Ta. A volume-based particle size distribution curve of the positive electrode material is a bimodal curve.

17 Claims, 3 Drawing Sheets

(52) U.S. Cl.
CPC ...... *C01P 2004/61* (2013.01); *C01P 2004/62* (2013.01); *C01P 2004/84* (2013.01); *C01P 2006/11* (2013.01); *C01P 2006/40* (2013.01)

(58) Field of Classification Search
CPC .............. C01P 2004/84; C01P 2006/11; C01P 2006/40
See application file for complete search history.

(56) References Cited

U.S. PATENT DOCUMENTS

| | | | | |
|---|---|---|---|---|
| 2022/0006081 | A1 | 1/2022 | Young et al. | |
| 2022/0059832 | A1* | 2/2022 | Han | H01M 4/505 |

FOREIGN PATENT DOCUMENTS

| | | | |
|---|---|---|---|
| CN | 111699576 | A | 9/2020 |
| CN | 113169320 | A | 7/2021 |
| CN | 113224271 | A | 8/2021 |
| CN | 114725344 | A | 7/2022 |
| CN | 111316480 | B | 9/2022 |
| KR | 20210058490 | A | 5/2021 |

OTHER PUBLICATIONS

Notification of Grant dated Oct. 1, 2025 for application CN 202380010252.X.
Extended European Search Report dated Mar. 3, 2026 for European Appl. No. 23919054.9.

* cited by examiner

POSITIVE ELECTRODE MATERIAL, PREPARATION METHOD OF SAME, POSITIVE ELECTRODE PLATE, SECONDARY BATTERY, AND ELECTRICAL DEVICE

CROSS REFERENCE TO RELATED APPLICATIONS

This application is a continuation of International application PCT/CN2023/074231 filed on Feb. 2, 2023, the subject matter of which is incorporated herein in its entirety.

TECHNICAL FIELD

This application relates to the field of battery technology, and in particular, to a positive electrode material, a preparation method of the positive electrode material, a positive electrode plate, a secondary battery, and an electrical device.

BACKGROUND

With the rapid development of the society and economy, the development and utilization of new energy sources have become increasingly urgent. Among the new energy sources, novel lithium-ion batteries are clean energy and are regarded as one of the most efficient electrochemical energy storage systems by virtue of advantages of safety, high cyclability, longevity, and environmental friendliness. A lithium-ion battery works primarily by movement of lithium ions between a positive electrode and a negative electrode. During charge and discharge, $Li^+$ ions intercalate and deintercalate back and forth between the two electrodes: when charge, $Li^+$ ions are deintercalated from the positive electrode, pass through an electrolyte solution, and are intercalated into the negative electrode, and the negative electrode gets into a lithium-rich state. During discharge, the opposite process applies. The positive electrode, negative electrode, separator, and electrolyte solution are the four key materials of a lithium-ion battery. Among the materials, the energy density and cycle performance of the lithium-ion battery mainly depend on the energy density and cycle capacity of the positive electrode material.

SUMMARY

This application provides a positive electrode material, a preparation method of the positive electrode material, a positive electrode plate, a secondary battery, and an electrical device to improve cycle performance of the positive electrode material.

A first aspect of this application provides a positive electrode material. The positive electrode material includes a ternary positive electrode substrate and optionally a coating layer. The coating layer coats a surface of the ternary positive electrode substrate. The ternary positive electrode substrate includes Li, Ni, Al, and an M element. The M element includes a combination of one or more of Mn, Co, Ti, Zr, W, Nb, Mo, Si, Mg, B, Cr, or Ta. A volume-based particle size distribution curve of the positive electrode material is a bimodal curve. A low-peak particle diameter in the bimodal curve is a first peak diameter, and a high-peak particle diameter in the bimodal curve is a second peak diameter. An average mass percent of Al in positive electrode material particles with a particle size smaller than the first peak diameter is $m_1$, and an average mass percent of Al in positive electrode material particles with a particle size larger than the second peak diameter is $m_2$, satisfying: $m_1<m_2$.

In the positive electrode material of this application, a large particle size coordinates with a small particle size, and the aluminum content in differently sized particles in the positive electrode material is designed, thereby not only improving the volumetric energy density of the positive electrode material, but also improving the cycle life and storage performance of the positive electrode material, and improving the overall performance of the graded positive electrode material.

The M element as a dopant improves the structural stability of the positive electrode substrate or improves the lithium-ion conductivity of the substrate. The presence of high-valent elements such as $Mo^{6+}$, $Ta^{5+}$, $W^{6+}$, and $Ti^{4+}$ in the M elements can assist the Al element in stabilizing the layered structure of the positive electrode material. Some M elements with a relatively short M-O bond can widen the deintercalation channel of lithium ions and improve the specific capacity of the positive electrode material.

In any embodiment of the first aspect, an average molar fraction of Al in particles with a particle size matching a $D_{v10}$ point of the bimodal curve in the positive electrode material is 0.005 to 0.1, and this average molar fraction corresponds to an average mass percent of 0.138% to 2.8%; and/or, an average molar fraction of Al in particles with a particle size matching a $D_{v50}$ point of the bimodal curve in the positive electrode material is 0.1 to 0.12, and this average molar fraction corresponds to an average mass percent of 2.8% to 3.3%; and/or, an average molar fraction of Al in particles with a particle size matching a $D_{v90}$ point of the bimodal curve in the positive electrode material is 0.12 to 0.15, and this average molar fraction corresponds to an average mass percent of 3.3% to 4.2%. With the increase of the particle size, the Al content in the positive electrode material is increased, thereby improving the structural stability of the positive electrode material during charge-discharge cycles more pertinently on the whole, and in turn, more effectively improving the cycle life and storage performance of the positive electrode material.

In any embodiment of the first aspect, the first peak diameter falls between 0.5 μm and 5 μm, and optionally between 1 μm and 3 μm. Optionally, the second peak diameter falls between 6 μm and 18 μm, and optionally between 8 μm and 12 μm. The matching between the first peak diameter and the second peak diameter endows the positive electrode material with a higher compaction density.

In any embodiment of the first aspect, the particles with a particle size that lies at the first peak diameter are defined as a small-grained particles of the positive electrode material. The particles with a particle size that lies at the second peak diameter are defined as a large-grained particles of the positive electrode material. The average mass percent of Al in the small-grained particles of the positive electrode material is less than the average mass percent of Al in the large-grained particles of the positive electrode material. Such a design further optimizes the effect of grading between large particles and small particles of the positive electrode material.

In any embodiment of the first aspect, a mass percent of Al in the small-grained particles per unit volume of the positive electrode material is defined as Si, and a mass percent of Al in the large-grained particles per unit volume of the positive electrode material is defined as $S_2$. The first peak diameter is defined as $D_1$, and the second peak diameter is defined as $D_2$, satisfying: $(D_1)^3 \times S_1 < (D_2)^3 \times S_2$. Such a design ensures that the Al content in the large particles of the positive electrode material is higher than the Al content in the small particles of the positive electrode material, thereby more effectively solving the problem of cracking of large particles of the positive electrode material during cycling, and in turn, more significantly improving the cycle performance of the material.

In any embodiment of the first aspect, a bimodal peak position difference satisfies $D_2 - D_1 \geq D_1 \times (S_1/S_2)^{1/3}$. Such a bimodal peak position difference endows the positive electrode material with higher cycle stability.

In any embodiment of the first aspect, the bimodal curve is fitted in a peak separation manner, so as to obtain a small-particle fitted peak and a large-particle fitted peak, a volume particle size distribution span of the large-particle fitted peak satisfies: $0.2 \leq (D_{v90} - D_{v10})/D_{v50} \leq 1$, and further optionally satisfies: $0.8 \leq (D_{v90} - D_{v10})/D_{v50} \leq 1$; and/or, a volume particle size distribution span of the small-particle fitted peak satisfies: $1.4 \leq (D_{v90} - D_{v10})/D_{v50} \leq 2$, and further optionally satisfies: $1.4 \leq (D_{v90} - D_{v10})/D_{v50} \leq 1.7$. Graded in the above manner, the particle size of the positive electrode material can achieve a relatively large span, thereby further improving the compaction density of the positive electrode material.

In any embodiment of the first aspect, the positive electrode material includes: a first positive electrode material, where the first positive electrode material includes a first ternary positive electrode substrate and optionally a first coating layer, the first coating layer coats a surface of the first ternary positive electrode substrate, and a chemical formula of the first ternary positive electrode substrate is $Li_{a1}[Ni_{x1}Al_{y1}M_{z1}]O_2$, where $0.6 \leq x1 < 1$, $0 < y1 \leq 0.1$, $0 < z1 < 0.4$, $1.0 \leq a1 \leq 1.2$, and optionally, $0.8 \leq x1 < 1$, $0 < y1 < 0.05$, and $x1/y1 = 10$ to 100; and a second positive electrode material, where the second positive electrode material includes a second ternary positive electrode substrate and optionally a second coating layer, the second coating layer coats a surface of the second ternary positive electrode substrate, and a chemical formula of the second ternary positive electrode substrate is $Li_{a2}[Ni_{x2}Al_{y2}M_{z2}]O_2$, where $0.6 \leq x2 < 1$, $0.05 \leq y2 < 0.4$, $0 < z2 \leq 0.35$, $1.0 \leq a2 \leq 1.2$, optionally, $0.8 \leq x2 < 1$, $0.05 \leq y2 < 0.2$, and $x2/y2 = 4$ to 20. M in the first positive electrode material and M in the second positive electrode material each independently include a combination of one or more of Mn, Co, Ti, Zr, W, Nb, Mo, Si, Mg, B, Cr, or Ta. By mixing the two types of positive electrode materials, this application can flexibly adjust the composition of the positive electrode material, and adjust the cycle performance of the positive electrode material.

In any embodiment of the first aspect, $y1/z1 = 0.5$ to 10, optionally 1 to 5; and $y2/z2 = 0.01$ to 1, optionally 0.1 to 0.75. Controlling the above ratios can not only give full play to the effect of the M element in improving the lithium-ion conductivity of the positive electrode material, but also improve the effect of the M element in assisting the Al element to stabilize the layered structure of the positive electrode material.

In any embodiment of the first aspect, a volume particle size distribution of the first positive electrode material matches characteristics of the small-particle fitted peak; and a volume particle size distribution of the second positive electrode material matches characteristics of the large-particle fitted peak. In other words, the $D_{v50}$ of the first positive electrode material with a relatively low Al content is less than the $D_{v50}$ of the second positive electrode material with a relatively high Al content, thereby improving the structural stability of the two types of positive electrode materials, reducing the difference in structural stability between the two types of positive electrode materials, and in turn, more significantly improving the overall cycle performance of the positive electrode material.

In any embodiment of the first aspect, a mass ratio of the first positive electrode material to the second positive electrode material is 1:1 to 1:10, and optionally 1:2 to 1:5. Such a design contributes to achieving relatively high electrochemical performance and volumetric energy density of the material.

In any embodiment of the first aspect, the first positive electrode material includes a first coating layer, and/or the second positive electrode material includes a second coating layer, the first coating layer and/or the second coating layer each independently includes an Al-containing compound; optionally, a coating amount of Al in the positive electrode material is 200 to 2000 ppm, and further optionally 500 to 1000 ppm. The coating layer further suppresses side reactions on the interface and improves the cycle performance, storage performance, and safety performance of the positive electrode material.

In any embodiment of the first aspect, a powder compaction density of the positive electrode material under a 5-ton pressure is greater than or equal to 3.5 g/cm$^3$. Such a design contributes to a relatively high energy density of the battery containing the positive electrode material.

A second aspect of this application provides a method for preparing the positive electrode material. The preparation method includes: preparing a first ternary material precursor and a second ternary material precursor each containing an Al element and an M element, where an aluminum content in the first ternary material precursor is less than an aluminum content in the second ternary material precursor, and a particle size of the first ternary material precursor is smaller than a particle size of the second ternary material precursor; mixing the first ternary material precursor, the second ternary material precursor, and a lithium salt at a specified ratio to form a precursor mixture, and sintering the precursor mixture for a first time in an oxygen-containing atmosphere to obtain a substrate mixture of a first ternary positive electrode substrate and a second ternary positive electrode substrate; and optionally, mixing the substrate mixture with a coating layer feedstock, and then sintering the mixture for a second time in an oxygen-containing atmosphere to obtain the positive electrode material.

The above preparation method can adjust the dosage of the first ternary material precursor, the second ternary material precursor, and the lithium salt according to the specified ratio, thereby flexibly adjusting the volumetric energy density and cycle stability of the positive electrode material. The process of the above preparation method can be implemented by just using a conventional preparation process of a ternary positive electrode material, so that the implementation cost is relatively low.

In any embodiment of the second aspect, a process of preparing the first ternary material precursor or the second ternary material precursor includes: mixing a Ni salt solution, an Al salt solution, and an M salt solution at a specified ratio to form a mixed salt solution; feeding the mixed salt solution, a precipitant, and a complexant into a reactor, controlling a pH value and a reaction temperature of materials in the reactor to perform a co-precipitation reaction to obtain a product system, where the reaction temperature is 30° C. to 80° C.; during preparation of the first ternary material precursor, the pH value is denoted as pH1, and the pH1 is 11 to 14; during preparation of the second ternary material precursor, the pH value is denoted as pH2, and the pH2 is 8 to 10.5; and separating a solid substance from the product system to obtain the first ternary material precursor or the second ternary material precursor. The precursor is prepared by a co-precipitation method, and the precipitation rate is adjusted by controlling the pH value during the co-precipitation, so as to adjust the particle size of the resultant precursor. After completion of the co-precipitation, the solid substance in the product system is separated by a conventional solid-liquid separation method such as a sedimentation method or a filtration method, so as to obtain the corresponding precursor.

In any embodiment of the second aspect, the Ni salt and the M salt each independently include one or more of a sulfate salt, a nitrate salt, an oxalate salt, or a chloride; and/or, the Al salt is a mixture of one or more of a sulfate salt, a nitrate salt, an oxalate salt, a metaaluminate salt, or a chloride; optionally, a total concentration of the Ni salt, the Al salt, and the M salt in the mixed salt solution is 0.1 to 10 mol/L; and/or, the precipitant includes an aqueous solution containing one or more of sodium hydroxide, sodium carbonate, potassium carbonate, or potassium hydroxide, and optionally a concentration of the precipitant is 0.1 to 20 mol/L; and/or, the complexant includes an aqueous solution containing one or more of ammonia water, ammonium chloride, ammonium sulfate, urea, citric acid, or EDTA, and optionally a concentration of the complexant is 0.1 to 10 mol/L. The above metal salts are of relatively high solubility, and are available from a wide range of sources, and are cost-effective. The above precipitant and complexant are of stable performance, and can achieve relatively stable pH value control results and precipitation effects.

In any embodiment of the second aspect, the lithium salt includes one or more of $LiOH·H_2O$, $Li_2CO_3$, $Li_2SO_4$, $LiNO_3$, $LiC_2O_4$, or $CH_3COOLi$; optionally, a molar ratio of lithium to a metal Me in the precursor mixture is 1.0 to 1.2, and Me includes Ni, Al, and the M element; optionally, a sintering temperature of the first-time sintering is 600° C. to 900° C.; and/or, a sintering time of the first-time sintering is 8 to 20 hours; and/or, the oxygen-containing atmosphere in the first-time sintering is an air atmosphere or an 02 atmosphere. The above parameters such as lithium source, lithium content, first-time sintering temperature, and first-time sintering time can ensure the stability of the elemental composition and structure and excellent electrochemical performance of the prepared material.

In any embodiment of the second aspect, the coating layer feedstock includes one or more of $Al_2O_3$, $Al_2(SO_4)_3$, $AiCl_3$, $Al(NO_3)_3$, $Al_2(CO_3)_3$, $Al(OH)_3$, $NaAlO_2$, or $KAlO_2$; optionally, a particle size of the coating layer feedstock is 5 nm to 500 nm, and further optionally 100 nm to 300 nm; optionally, based on a coating amount of Al, a content of the coating layer feedstock relative to the substrate mixture is 200 to 2000 ppm, and further optionally 500 to 1000 ppm. By using the coating layer feedstock of the above particle size and dosage, this application can achieve a more uniform and dense coating effect, thereby improving the cycle performance of the material.

In any embodiment of the second aspect, a sintering temperature of the second-time sintering is 400° C. to 700° C., optionally 500° C. to 600° C.; and/or, a sintering time of the second-time sintering is 5 to 15 hours, optionally 7 to 10 hours; and/or, the oxygen-containing atmosphere in the second-time sintering is an air atmosphere or an $O_2$ atmosphere. The second-time sintering makes the Al-containing coating layer bonded stably to the surfaces of the large-particle substrate and the small-particle substrate, thereby further optimizing the coating effect.

A third aspect of this application provides a positive electrode plate. The positive electrode plate includes a current collector and a positive electrode film layer. The positive electrode film layer includes a positive active material. The positive active material is any one of the positive electrode materials disclosed above. The volumetric energy density of the positive electrode plate of this application is relatively high. The positive electrode plate is structurally stable and is not prone to shed powder during cycling, thereby achieving relatively high cycle performance.

A fourth aspect of this application provides a secondary battery. The secondary battery includes a positive electrode plate, a negative electrode plate, a separator, and an electrolyte solution. The positive electrode plate is the positive electrode plate disclosed above. The secondary battery of this application possesses a relatively high volumetric energy density and exhibits relatively high cycle stability.

A fifth aspect of this application provides an electrical device. The electrical device includes a secondary battery. The secondary battery includes the secondary battery disclosed above. The electrical device of this application is durably powered and runs stably.

BRIEF DESCRIPTION OF DRAWINGS

To describe the technical solutions of some embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

Figure 1:
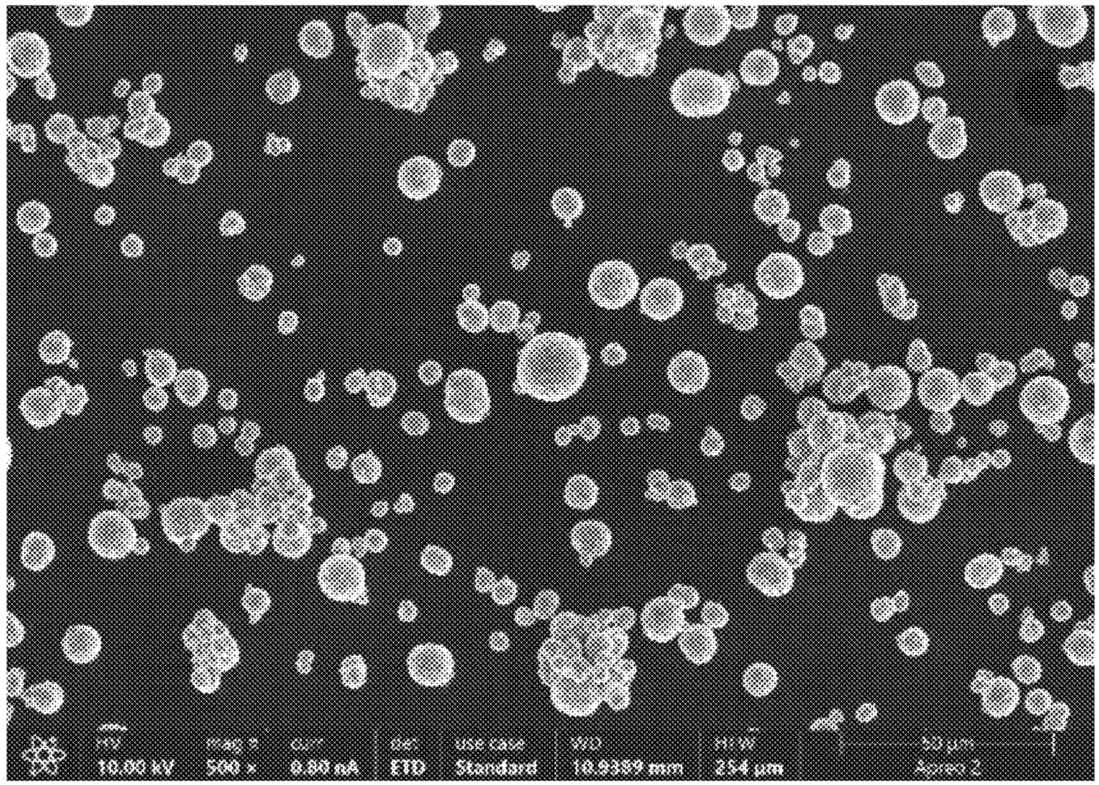
FIG. 1 is a scanning electron microscope (SEM) image of a material with graded particle sizes of large and small particles according to Embodiment 1.

The drawings are not drawn to scale.

LIST OF REFERENCE NUMERALS

1. battery pack; 2. upper box; 3. lower box; 4. battery module; 5. secondary battery; 51. housing; 52. electrode assembly; 53. cover plate.

DETAILED DESCRIPTION

The following gives a more detailed description of implementations of this application with reference to drawings and embodiments. The detailed description of the following embodiments and drawings are intended to describe the principles of this application illustratively, but not to limit the scope of this application. Therefore, this application is not limited to the described embodiments.

The following discloses and describes in detail some embodiments of a positive electrode material, a preparation method of same, a secondary battery, and an electrical device according to this application with due reference to drawings. However, unnecessary details may be omitted in some cases. For example, a detailed description of a well-known matter or repeated description of an essentially identical structure may be omitted. That is intended to prevent the following descriptions from becoming unnecessarily lengthy, and to facilitate understanding by a person skilled in the art. In addition, the drawings and the following descriptions are intended for a person skilled in the art to thoroughly understand this application, but not intended to limit the subject-matter set forth in the claims.

A "range" disclosed herein is defined in the form of a lower limit and an upper limit. A given range is defined by a lower limit and an upper limit selected. The selected lower and upper limits define the boundaries of a particular range. A range so defined may be inclusive or exclusive of the end values, and a lower limit of one range may be arbitrarily combined with an upper limit of another range to form a range. For example, if a range of 60 to 120 and a range of 80 to 110 are set out for a given parameter, it is expectable that such ranges may be understood as 60 to 110 and 80 to 120. In addition, if lower-limit values 1 and 2 are set out, and if upper-limit values 3, 4, and 5 are set out, the following ranges are all expectable: 1 to 3, 1 to 4, 1 to 5, 2 to 3, 2 to 4, and 2 to 5. Unless otherwise specified herein, a numerical range "a to b" is a brief representation of a combination of any real numbers between a and b inclusive, where both a and b are real numbers. For example, a numerical range "0 to 5" herein means all real numbers recited between 0 and 5 inclusive, and the expression "0 to 5" is just a brief representation of a combination of such numbers. In addition, a statement that a parameter is an integer greater than or equal to 2 is equivalent to a disclosure that the parameter is an integer such as 2, 3, 4, 5, 6, 7, 8, 9, 10, 11, 12, and so on.

Unless otherwise expressly specified herein, any embodiments and optional embodiments hereof may be combined with each other to form a new technical solution.

Unless otherwise expressly specified herein, any technical features and optional technical features hereof may be combined with each other to form a new technical solution.

Unless otherwise expressly specified herein, all steps described herein may be performed in sequence or at random, and preferably in sequence. For example, that the method includes steps (a) and (b) indicates that the method may include steps (a) and (b) performed in sequence, or steps (b) and (a) performed in sequence. For example, that the method may further include step (c) indicates that step (c) may be added into the method in any order. For example, the method may include steps (a), (b), and (c), or may include steps (a), (c), and (b), or may include steps (c), (a), and (b), and so on.

Unless otherwise expressly specified herein, "include" and "comprise" mentioned herein mean open-ended inclusion, or closed-ended inclusion. For example, the terms "include" and "comprise" may mean inclusion of other items that are not recited, or inclusion of only the items recited.

Unless otherwise expressly specified, the term "or" used herein is inclusive. For example, the expression "A or B" means "A alone, B alone, or both A and B". More specifically, all and any of the following conditions satisfy the condition "A or B": A is true (or existent) and B is false (or absent); A is false (or absent) and B is true (or existent); and, both A and B are true (or existent).

[Secondary Battery]

A secondary battery, also known as a rechargeable battery or storage battery, is a battery that is reusable after an active material in the battery is activated by charging the battery that has been discharged.

Generally, a secondary battery includes a positive electrode plate, a negative electrode plate, a separator, and an electrolyte solution. During charge and discharge of the battery, active ions (such as lithium ions) are shuttled between the positive electrode plate and the negative electrode plate by intercalation and deintercalation. Disposed between the positive electrode plate and the negative electrode plate, the separator primarily serves to prevent a short circuit between the positive electrode plate and the negative electrode plate while allowing passage of active ions. The electrolyte solution is located between the positive electrode plate and the negative electrode plate, and primarily serves to conduct the active ions.

[Positive Electrode Material]

A typical embodiment of this application provides a positive electrode material. The positive electrode material includes a ternary positive electrode substrate and optionally a coating layer. The coating layer coats a surface of the ternary positive electrode substrate. The ternary positive electrode substrate includes Li, Ni, Al, and an M element. The M element includes a combination of one or more of Mn, Co, Ti, Zr, W, Nb, Mo, Si, Mg, B, Cr, or Ta. A volume-based particle size distribution curve of the positive electrode material is a bimodal curve. A low-peak particle diameter in the bimodal curve is a first peak diameter, and a high-peak particle diameter in the bimodal curve is a second peak diameter. An average mass percent of Al in positive electrode material particles with a particle size smaller than the first peak diameter is $m_1$, and an average mass percent of Al in positive electrode material particles with a particle size larger than the second peak diameter is $m_2$, satisfying: $m_1<m_2$.

Based on the difference in the response of large and small particles to external stress, with the same constituents, large particles are more prone to cause crystal defects and particle cracking under accumulated stress generated during charge and discharge, and give rise to subsequent severer interface side reactions and irreversible phase changes. Therefore, different constituents are designed for the particles of different sizes in this application.

The Al—O bond possesses a higher bond energy than other M-O bonds. Therefore, the Al element in the ternary positive electrode substrate can stabilize the layered structure during charge-discharge cycles, suppress the irreversible phase transition of the layered structure to the rock-salt phase, and suppress the release of lattice oxygen, thereby improving the cycle life and storage performance of the positive electrode material. The volume-based particle size distribution curve of the positive electrode material of this application is a bimodal curve, indicating that the positive electrode material is a mixture of large and small particles, thereby effectively increasing the compaction density of the material. Moreover, m1 is less than m2, indicating that the Al content in the larger-sized particles of the positive electrode material is higher, thereby more effectively improving the cycle stability of these particles of the positive electrode material. Therefore, by designing the composition of the positive electrode material, this application not only increases the volumetric energy density of the positive electrode material, but also improves the cycle life and storage performance of the positive electrode material, and improving the overall performance of the graded positive electrode material. In addition, the M element as a dopant improves the structural stability of the positive electrode substrate or improves the lithium-ion conductivity of the substrate.

In some embodiments, an average molar fraction of Al in particles with a particle size matching a $D_{v10}$ point of the bimodal curve in the positive electrode material is 0.005 to 0.1, and this average molar fraction corresponds to an average mass percent of 0.138% to 2.8%; and/or, an average molar fraction of Al in particles with a particle size matching a $D_{v50}$ point of the bimodal curve in the positive electrode material is 0.1 to 0.12, and this average molar fraction corresponds to an average mass percent of 2.8% to 3.3%; and/or, an average molar fraction of Al in particles with a particle size matching a $D_{v90}$ point of the bimodal curve in the positive electrode material is 0.12 to 0.15, and this average molar fraction corresponds to an average mass percent of 3.3% to 4.2%. With the increase of the particle size, the Al content in the positive electrode material is also increased, thereby improving the structural stability of the positive electrode material during charge-discharge cycles more pertinently on the whole, and in turn, more effectively improving the cycle life and storage performance of the positive electrode material.

The Al content in the particles of different volume diameters may be achieved by adjusting the composition of the positive electrode material and the particle size distribution of the positive electrode material. For example, the positive electrode material may be made up of particles of the same volume particle size distribution but different Al contents, so as to make the Al content changed in the particles of a specified volume diameter.

In this application, the particle size of the positive electrode material is measured by a particle size test instrument such as a laser particle size analyzer. The Al content is measured by using a scanning electron microscope in an EDS mode, by which a single particle is scanned to determine the element type and element content quantitatively.

The particle sizes of the positive electrode material for use in this application may be selected within a conventionally achievable particle size range. In some embodiments, the first peak diameter falls between 0.5 μm and 5 μm, and optionally between 1 μm and 3 μm. Optionally, the second peak diameter falls between 6 μm and 18 μm, and optionally between 8 μm and 12 μm. The coordination of the above peak diameters allows the interstices between particles of different sizes in the positive electrode material to be filled sufficiently, thereby contributing to a higher compaction density of the positive electrode material.

In some embodiments, the particles with a particle size that lies at the first peak diameter are defined as a small-grained particles of the positive electrode material. The particles with a particle size that lies at the second peak diameter are defined as a large-grained particles of the positive electrode material. The average mass percent of Al in the small-grained particles of the positive electrode material is less than the average mass percent of Al in the large-grained particles of the positive electrode material. Such a design more significantly improves the structural stability of large particles of the positive electrode material, reduces the difference in structural stability between a large particle and a small particle, and optimizes the effect of grading between the large particles and the small particles of the positive electrode material.

A mass percent of Al in the small-grained particles per unit volume of the positive electrode material is defined as Si, and a mass percent of Al in the large-grained particles per unit volume of the positive electrode material is defined as $S_2$. The first peak diameter is defined as Di, and the second peak diameter is defined as $D_2$. In order to improve the structural stability of the large particles of the positive electrode material in use, in some embodiments, it is designed that $(D_1)^3 \times Si < (D_2)^3 \times S_2$. Such a design ensures that the Al content in the large particles of the positive electrode material is higher than the Al content in the small particles of the positive electrode material, thereby more effectively solving the problem of cracking of large particles of the positive electrode material during cycling, and in turn, more significantly improving the cycle performance of the material.

In some embodiments, a bimodal peak position difference satisfies $D_1 - D_2 > D_2 \times (S_2/S_1)^{1/3}$. Such a design ensures that the Al content in the large particles of the positive electrode material is higher than the Al content in the small particles of the positive electrode material, thereby increasing the strength of the large particles of the positive electrode material, and making the strength tend to be consistent between the large particles and the small particles of the positive electrode material. In this way, the large particles and small particles are not prone to crack during cycling, so that the positive electrode material is more stable in structure and during cycling.

In some embodiments, the bimodal curve is fitted in a peak separation manner, so as to obtain a small-particle fitted peak and a large-particle fitted peak, a volume particle size distribution span of the large-particle fitted peak satisfies: $0.2 < (D_{v90} - D_{v10})/D_{v50} \le 1$, and further optionally satisfies: $0.8 \le (D_{v90} - D_{v10})/D_{v50} \le 1$; and/or, a volume particle size distribution span of the small-particle fitted peak satisfies: $1.4 \le (D_{v90} - D_{v10})/D_{v50} \le 2$, and further optionally satisfies: $1.4 \le (D_{v90} - D_{v10})/D_{v50} \le 1.7$.

The particle sizes of the positive electrode material are graded in the above manner. Especially, the volume-based particle size distribution span of the large particles of the positive electrode material is relatively small, so that the particle distribution is uniform, and the particle interstices and the particle strength are uniform. In this way, the stability of the positive electrode plate containing the particles is high. The volume-based particle size distribution span of the small particles of the positive electrode material is relatively large, and the particle size distribution range of the small particles is wide, thereby giving full play to the capability of filling the pores between the particles, further increasing the compaction density of the positive electrode material. Optionally, the powder compaction density of the positive electrode material under a 5-ton pressure is greater than or equal to 3.5 g/cm$^3$.

In some embodiments, the positive electrode material includes: a first positive electrode material, where the first positive electrode material includes a first ternary positive electrode substrate and optionally a first coating layer, the first coating layer coats a surface of the first ternary positive electrode substrate, and a chemical formula of the first ternary positive electrode substrate is $Li_{a1}[Ni_{x1}Al_{y1}M_{z1}]O_2$, where $0.6 \le x1 < 1$, $0 < y1 \le 0.1$, $0 < z1 < 0.4$, $1.0 \le a1 \le 1.2$, and optionally, $0.8 \le x1 < 1$, $0 < y1 < 0.05$, and $x1/y1 = 10$ to 100; and a second positive electrode material, where the second positive electrode material includes a second ternary positive electrode substrate and optionally a second coating layer, the second coating layer coats a surface of the second ternary positive electrode substrate, and a chemical formula of the second ternary positive electrode substrate is $Li_{a2}[Ni_{x2}Al_{y2}M_{z2}]O_2$, where 0.6≤x2<1, 0.05≤y2<0.4, 0<z2≤0.35, 1.0≤a2≤1.2, optionally, 0.8≤x2<1, 0.05≤y2<0.2, and x2/y2=4 to 20. M in the first positive electrode material and M in the second positive electrode material each independently include a combination of one or more of Mn, Co, Ti, Zr, W, Nb, Mo, Si, Mg, B, Cr, or Ta. By mixing the two types of positive electrode materials, this application can flexibly adjust the composition of the positive electrode material, and adjust the cycle performance of the positive electrode material.

It is hereby noted that in the chemical formulas of the first ternary positive electrode substrate and the second ternary positive electrode substrate, for convenience, the stoichiometric coefficient of oxygen is represented as 2, but the stoichiometric coefficient may be non-integer in practical applications. In addition, a1 and a2 in the above chemical formulas are design parameters reflecting the lithium content in the raw material feed of the ternary positive electrode material during manufacture. Usually, the positive electrode material in a batteries available on the market has undergone a formation aging process, and may have undergone some charge-discharge cycles. Therefore, during the charge-discharge cycles, the amount of Li in the positive electrode may incur a loss. In this case, in terms of composition analysis, when the battery is discharged until the voltage reaches a lower cut-off voltage limit, the lithium contents a1 and a2 may be between 0.65 and 1.2.

Being high-nickel positive electrode materials, the first positive electrode material and the second positive electrode material achieve a high level of specific capacity, cost-effectiveness, and safety.

The ternary positive electrode substrate doped with the metal element improves the structural stability of the positive electrode substrate or improves the lithium-ion conductivity of the substrate. In some embodiments, y1/z1 is 0.01 to 1, optionally 0.1 to 0.75; and y2/z2 is 0.5 to 10, optionally 1 to 5. Controlling the above ratios can not only give full play to the effect of the M element in improving the lithium-ion conductivity of the positive electrode material, but also improve the effect of the M element in assisting the Al element to stabilize the layered structure of the positive electrode material.

The main differences between the first positive electrode material and the second positive electrode material are the particle size and the aluminum content. In some embodiments, the volume particle size distribution of the first positive electrode material matches characteristics of the small-particle fitted peak, and the volume particle size distribution of the second positive electrode material matches characteristics of the large-particle fitted peak. In this way, a correspondence is formed between the particle size and the Al content, and the structural stability of the two positive electrode materials and the difference in structural stability can be adjusted by leveraging and adjusting the particle size and Al content of the first positive electrode material and the second positive electrode material, thereby maximally optimizing the overall cycle stability and storage performance of the positive electrode material.

With the increase of the content of the second positive electrode material to a specified extent, the defects caused by the cracking of large particles become more obvious. However, at the same time, the effect of grading of particle sizes of the first positive electrode material and the second positive electrode material is increasingly obvious. In order to improve both the cycle performance and the energy density of the positive electrode material to the greatest practicable extent, in some embodiments, the mass ratio of the first positive electrode material to the second positive electrode material is 1:1 to 1:10, and optionally 1:2 to 1:5, so as to achieve high electrochemical performance and a high volumetric energy density of the material.

The mass ratio of the first positive electrode material to the second positive electrode material may be determined with reference to the following method:

In some embodiments, a bimodal peak position difference satisfies $D_2-D_1>D_1\times(S_1/S_2)^{1/3}$. Such a design ensures that the Al content in the large particles of the positive electrode material is higher than the Al content in the small particles of the positive electrode material, thereby increasing the strength of the large particles of the positive electrode material, and making the strength tend to be consistent between the large particles and the small particles of the positive electrode material. In this way, the large particles and small particles are not prone to crack during cycling, so that the positive electrode material is more stable in structure and during cycling.

In some embodiments, the first positive electrode material and the second positive electrode material each independently further include a coating layer. The first positive electrode material includes a first coating layer. The second positive electrode material includes a second coating layer. The first coating layer and the second coating layer each independently include an aluminum-containing compound. The first coating layer and the second coating layer can effectively suppress side reactions at an interface between the internal substrate and an electrolyte solution, and effectively improve the cycle performance, storage performance, and safety performance of the ternary positive electrode material. Optionally, the coating amount of Al in the positive electrode material is 200 to 2000 ppm, and further optionally 500 to 1000 ppm.

The positive electrode material of this application may be prepared by a method similar to the preparation method of a conventional ternary positive electrode material. Another typical embodiment of this application provides a method for preparing the positive electrode material. The preparation method includes: preparing a first ternary material precursor and a second ternary material precursor each containing an Al element and an M element, where an aluminum content in the first ternary material precursor is less than an aluminum content in the second ternary material precursor, and a particle size of the first ternary material precursor is smaller than a particle size of the second ternary material precursor; mixing the first ternary material precursor, the second ternary material precursor, and a lithium salt at a specified ratio to form a precursor mixture, and sintering the precursor mixture for a first time in an oxygen-containing atmosphere to obtain a substrate mixture of a first ternary positive electrode substrate and a second ternary positive electrode substrate; and optionally, mixing the substrate mixture with a coating layer feedstock, and then sintering the mixture for a second time in an oxygen-containing atmosphere to obtain the positive electrode material.

The above preparation method can adjust the dosage of the first ternary material precursor, the second ternary material precursor, and the lithium salt according to the specified ratio, thereby flexibly adjusting the volumetric energy density and cycle stability of the positive electrode material. The process of the above preparation method can be implemented by just using a conventional preparation process of a ternary positive electrode material, so that the implementation cost is relatively low.

In some embodiments, a process of preparing the first ternary material precursor or the second ternary material precursor includes: mixing a Ni salt solution, an Al salt solution, and an M salt solution at a specified ratio to form a mixed salt solution; feeding the mixed salt solution, a precipitant, and a complexant into a reactor, controlling a pH value and a reaction temperature of materials in the reactor to perform a co-precipitation reaction to obtain a product system, where the reaction temperature is 30° C. to 80° C.; during preparation of the first ternary material precursor, the pH value is denoted as pH1, and the pH1 is 11 to 14; during preparation of the second ternary material precursor, the pH value is denoted as pH2, and the pH2 is 8 to 10.5; and separating a solid substance from the product system to obtain the first ternary material precursor or the second ternary material precursor. The precursor is prepared by a co-precipitation method, and the precipitation rate is adjusted by controlling the pH value during the co-precipitation, so as to adjust the particle size of the resultant precursor. After completion of the co-precipitation, the solid substance in the product system is separated by a conventional solid-liquid separation method such as a sedimentation method or a filtration method, so as to obtain the corresponding precursor.

All the feedstocks used in the preparation method may be selected according to the prior art. In some embodiments, the Ni salt and the M salt each independently include one or more of a sulfate salt, a nitrate salt, an oxalate salt, or a chloride; and/or, the Al salt is a mixture of one or more of a sulfate salt, a nitrate salt, an oxalate salt, a metaaluminate salt, or a chloride; optionally, a total concentration of the Ni salt, the Al salt, and the M salt in the mixed salt solution is 0.1 to 10 mol/L; and/or, the precipitant includes an aqueous solution containing one or more of sodium hydroxide, sodium carbonate, potassium carbonate, or potassium hydroxide, and optionally a concentration of the precipitant is 0.1 to 20 mol/L; and/or, the complexant includes an aqueous solution containing one or more of ammonia water, ammonium chloride, ammonium sulfate, urea, citric acid, or EDTA, and optionally a concentration of the complexant is 0.1 to 10 mol/L. The above metal salts are of relatively high solubility, and are available from a wide range of sources, and are cost-effective. The above precipitant and complexant are of stable performance, and can achieve relatively stable pH value control results and precipitation effects.

In some embodiments, the lithium salt includes one or more of $LiOH \cdot H_2O$, $Li_2CO_3$, $Li_2SO_4$, $LiNO_3$, $LiC_2O_4$, or $CH_3COOLi$; optionally, a molar ratio of lithium to a metal Me in the precursor mixture is 1.0 to 1.2, and Me includes Ni, Al, and the M element; optionally, a sintering temperature of the first-time sintering is 600° C. to 900° C.; and/or, a sintering time of the first-time sintering is 8 to 20 hours; and/or, the oxygen-containing atmosphere in the first-time sintering is an air atmosphere or an $O_2$ atmosphere. The above parameters such as lithium source, lithium content, first-time sintering temperature, and first-time sintering time can ensure the stability of the elemental composition and structure and excellent electrochemical performance of the prepared material.

The coating layer feedstock may be selected according to the composition of the desired coating layer. For example, when a metal oxide coating layer is applied, the feedstock of the coating layer may be a corresponding oxide or salt of the metal. In some embodiments, the coating layer is a compound of Al, such as aluminum oxide, and the coating layer feedstock includes one or more of $Al_2O_3$, $Al_2(SO_4)_3$, $AlCl_3$, $Al(NO_3)_3$, $Al_2(CO_3)_3$, $Al(OH)_3$, $NaAlO_2$, or $KAlO_2$. The particle size of the coating layer feedstock is 5 nm to 500 nm, and optionally 100 nm to 300 nm; optionally, based on a coating amount of Al, a content of the coating layer feedstock relative to the substrate mixture is 200 to 2000 ppm, and further optionally 500 to 1000 ppm. By using the coating layer feedstock of the above particle size and dosage, this application can achieve a more uniform and dense coating effect, thereby improving the cycle performance of the material.

In some embodiments, the sintering temperature of the second-time sintering is 400° C. to 700° C., optionally 500° C. to 600° C.; and/or, a sintering time of the second-time sintering is 5 to 15 hours, optionally 7 to 10 hours; and/or, the oxygen-containing atmosphere in the second-time sintering is an air atmosphere or an $O_2$ atmosphere. The second-time sintering makes the Al-containing coating layer bonded stably to the surfaces of the large-particle substrate and the small-particle substrate, thereby further optimizing the coating effect.

[Positive Electrode Plate]

A positive electrode plate generally includes a positive current collector and a positive electrode film layer that overlays at least one side of the positive current collector. The positive electrode film layer includes a positive active material. The positive active material is any one of the positive electrode materials disclosed in this application.

As an example, the positive current collector includes two surfaces opposite to each other in a thickness direction of the positive current collector. The positive electrode film layer is disposed on either or both of the two opposite surfaces of the positive current collector.

In some embodiments, the positive current collector may be metal foil or a composite current collector. For example, the metal foil may be aluminum foil. The composite current collector may include a polymer material substrate and a metal layer formed on at least one surface of the polymer material substrate. The composite current collector may be formed by overlaying the polymer material substrate with a metal material (for example, aluminum, aluminum alloy, nickel, nickel alloy, titanium, titanium alloy, silver, and silver alloy). The polymer material substrate may be, for example, polypropylene (PP), polyethylene terephthalate (PET), polybutylene terephthalate (PBT), polystyrene (PS), or polyethylene (PE).

In some embodiments, the positive electrode film layer further optionally includes a binder. As an example, the binder may include at least one of polyvinylidene difluoride (PVDF), polytetrafluoroethylene (PTFE), poly(vinylidene fluoride-co-tetrafluoroethylene-co-propylene), poly(vinylidene fluoride-co-hexafluoropropylene-co-tetrafluoroethylene), poly(tetrafluoroethylene-co-hexafluoropropylene), or fluorinated acrylate resin.

In some embodiments, the positive electrode film layer further optionally includes a conductive agent. As an example, the conductive agent may include at least one of superconductive carbon, acetylene black, carbon black, Ketjen black, carbon dots, carbon nanotubes, graphene, or carbon nanofibers.

In some embodiments, the positive electrode plate may be prepared according to the following method: dispersing the ingredients of the positive electrode plate such as the positive active material, the conductive agent, the binder, and any other ingredients into a solvent (such as N-methylpyrrolidone) to form a positive electrode slurry, coating a positive current collector with the positive electrode slurry, and performing steps such as drying and cold pressing to obtain the positive electrode plate.

[Negative Electrode Plate]

The negative electrode plate includes a negative current collector and a negative electrode film layer disposed on at least one side of the negative current collector. The negative electrode film layer includes a negative active material.

As an example, the negative current collector includes two surfaces opposite to each other in a thickness direction of the negative current collector. The negative electrode film layer is disposed on either or both of the two opposite surfaces of the negative current collector.

In some embodiments, the negative current collector may be metal foil or a composite current collector. For example, the metal foil may be copper foil. The composite current collector may include a polymer material substrate and a metal layer formed on at least one surface of the polymer material substrate. The composite current collector may be formed by overlaying the polymer material substrate with a metal material (for example, copper, copper alloy, nickel, nickel alloy, titanium, titanium alloy, silver, and silver alloy). The polymer material substrate may be, for example, polypropylene (PP), polyethylene terephthalate (PET), polybutylene terephthalate (PBT), polystyrene (PS), or polyethylene (PE).

In some embodiments, the negative active material may be a negative active material well-known in the art for use in a battery. As an example, the negative active material may include at least one of the following materials: artificial graphite, natural graphite, soft carbon, hard carbon, silicon-based material, tin-based material, lithium titanium oxide, and the like. The silicon-based material may include at least one of elemental silicon, a silicon oxide compound, a silicon-carbon composite, a silicon-nitrogen composite, or a silicon alloy. The tin-based material may include at least one of elemental tin, a tin-oxygen compound, or a tin alloy. However, this application is not limited to such materials, and other conventional materials usable as a negative active material of a battery may be used instead. One of the negative active materials may be used alone, or at least two thereof may be used in combination.

In some embodiments, the negative electrode film layer further optionally includes a binder. As an example, the binder may include at least one of styrene-butadiene rubber (SBR), polyacrylic acid (PAA), polyacrylic acid sodium (PAAS), polyacrylamide (PAM), polyvinyl alcohol (PVA), sodium alginate (SA), polymethyl acrylic acid (PMAA), or carboxymethyl chitosan (CMCS).

In some embodiments, the negative electrode film layer further optionally includes a conductive agent. As an example, the conductive agent may include at least one of superconductive carbon, acetylene black, carbon black, Ketjen black, carbon dots, carbon nanotubes, graphene, or carbon nanofibers.

In some embodiments, the negative electrode film layer further optionally includes other agents, such as a thickener (for example, sodium carboxymethyl cellulose (CMC-Na)).

In some embodiments, the negative electrode plate may be prepared according to the following method: dispersing the ingredients of the negative electrode plate such as the negative active material, the conductive agent, and the binder and any other ingredients in a solvent (such as deionized water) to form a negative electrode slurry, coating a negative current collector with the negative electrode slurry, and performing steps such as drying and cold calendering to obtain the negative electrode plate.

[Electrolyte]

The electrolyte serves to conduct ions between the positive electrode plate and the negative electrode plate. The type of the electrolyte is not particularly limited in this application, and may be selected as required. For example, the electrolyte may be in a liquid state or gel state, or all solid state.

In some embodiments, the electrolyte is in a liquid state and includes an electrolyte salt and a solvent.

In some embodiments, the electrolyte salt may include at least one of lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluoro(oxalato)borate, lithium bis(oxalato)borate, lithium difluoro(bisoxalato)phosphate, or lithium tetrafluoro(oxalato)phosphate.

In some embodiments, the solvent may include at least one of ethylene carbonate, propylene carbonate, ethyl methyl carbonate, diethyl carbonate, dimethyl carbonate, dipropyl carbonate, methyl propyl carbonate, ethylene propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methyl sulfone, or (ethylsulfonyl)ethane.

In some embodiments, the electrolyte solution further optionally includes an additive. As an example, the additive may include a negative film-forming additive or a positive film-forming additive. The additive may further include an additive capable of improving some performance of the battery, for example, an additive for improving overcharge performance of the battery, or an additive for improving high- or low-temperature performance of the battery.

Separator

In some embodiments, the secondary battery further includes a separator. The type of the separator is not particularly limited in this application, and may be any well-known porous separator that is highly stable both chemically and mechanically.

In some embodiments, the separator may be made of a material that includes at least one of glass fiber, non-woven fabric, polyethylene, polypropylene, or polyvinylidene difluoride. The separator may be a single-layer film or a multilayer composite film, without being particularly limited. When the separator is a multilayer composite film, materials in different layers may be identical or different, without being particularly limited.

In some embodiments, the positive electrode plate, the negative electrode plate, and the separator may be made into an electrode assembly by winding or stacking.

In some embodiments, the secondary battery may include an outer package. The outer package may be configured to package the electrode assembly and the electrolyte.

In some embodiments, the outer package of the secondary battery may be a hard shell such as a hard plastic shell, an aluminum shell, a steel shell, or the like. Alternatively, the outer package of the secondary battery may be a soft package such as a pouch-type soft package. The soft package may be made of plastic such as polypropylene, polybutylene terephthalate, or polybutylene succinate.

Figure 2:
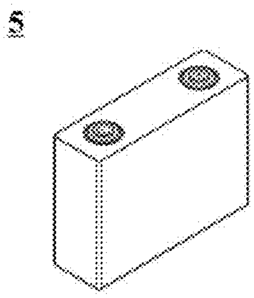
FIG. 2 is a schematic diagram of a secondary battery according to an embodiment of this application.

The shape of the secondary battery is not particularly limited in this application, and may be cylindrical, prismatic or any other shape. FIG. 2 shows a prismatic secondary battery 5 as an example.

Figure 3:
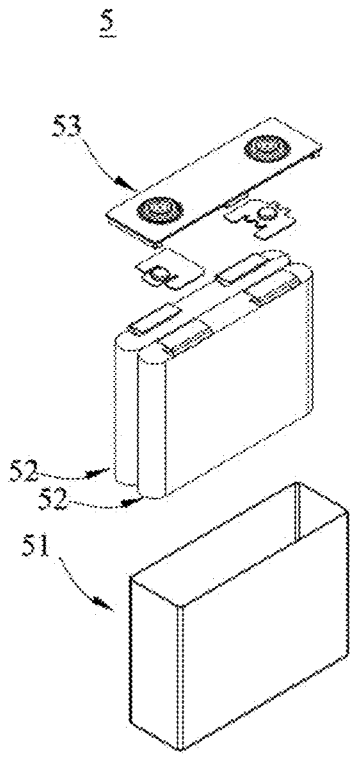
FIG. 3 is an exploded view of a secondary battery shown in FIG. 2 according to an embodiment of this application.

In some embodiments, referring to FIG. 3, the outer package may include a housing 51 and a cover plate 53. The housing 51 may include a bottom plate and a side plate connected to the bottom plate. The bottom plate and the side plate close in to form an accommodation cavity. The housing 51 is provided with an opening that communicates to the accommodation cavity. The cover plate 53 can be placed over the opening to seal the accommodation cavity. The positive electrode plate, the negative electrode plate, and the separator may be made into the electrode assembly 52 by winding or stacking. The electrode assembly 52 is packaged in the accommodation cavity. The electrolyte solution infiltrates in the electrode assembly 52. The number of electrode assemblies 52 in a secondary battery 5 may be one or more, and may be selected by a person skilled in the art as actually required.

In some embodiments, secondary batteries may be assembled to form a battery module. The battery module may include one or more secondary batteries, and the specific number of secondary batteries in a battery module may be selected by a person skilled in the art depending on practical applications and capacity of the battery module.

Figure 4:
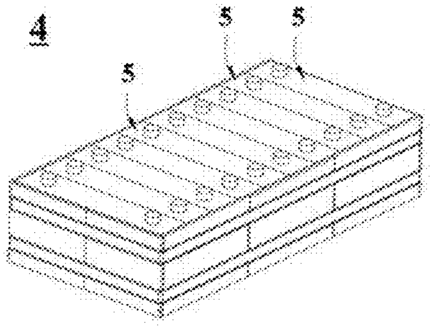
FIG. 4 is a schematic diagram of a battery module according to an embodiment of this application.

FIG. 4 shows a battery module 4 as an example. Referring to FIG. 4, in the battery module 4, a plurality of secondary batteries 5 may be arranged sequentially along a length direction of the battery module 4. Alternatively, the secondary batteries may be arranged in any other manner. Further, the plurality of secondary batteries 5 may be fixed by a fastener.

Optionally, the battery module 4 may further include a shell that provides an accommodation space. The plurality of secondary batteries 5 are accommodated in the accommodation space.

In some embodiments, the battery module may be assembled to form a battery pack. The battery pack may include one or more battery modules, and the specific number of battery modules in a battery pack may be selected by a person skilled in the art depending on practical applications and capacity of the battery pack.

Figure 5:
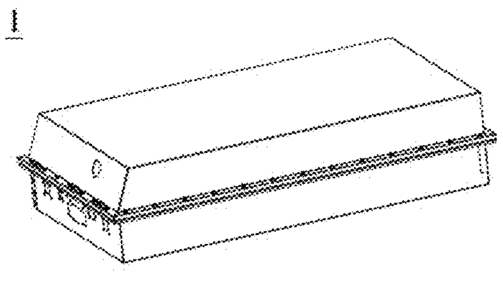
FIG. 5 is a schematic diagram of a battery pack according to an embodiment of this application.
Figure 6:
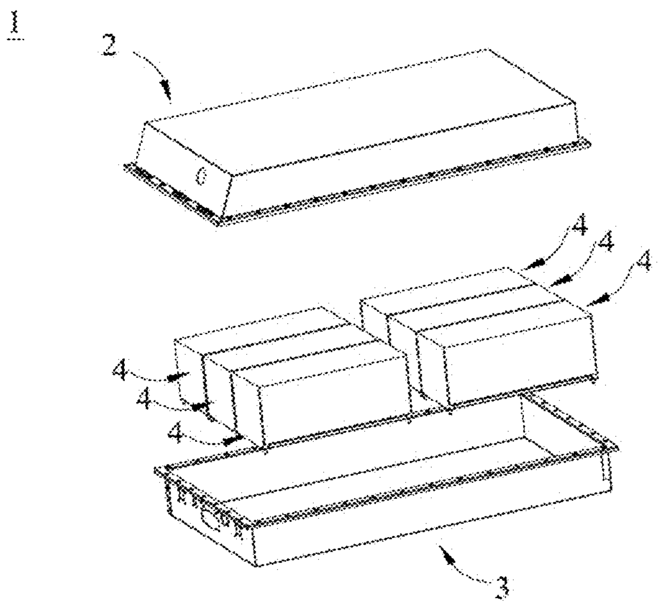
FIG. 6 is an exploded view of a battery pack shown in FIG. 5 according to an embodiment of this application.

FIG. 5 and FIG. 6 show a battery pack 1 as an example. Referring to FIG. 5 and FIG. 6, the battery pack 1 may include a battery box and a plurality of battery modules 4 disposed in the battery box. The battery box includes an upper box 2 and a lower box 3. The upper box 2 fits the lower box 3 to form a closed space for accommodating the battery modules 4. The plurality of battery modules 4 may be arranged in the battery box in any manner.

Further, this application provides an electrical device. The electrical device includes at least one of the secondary battery, the battery module, or the battery pack according to this application. The secondary battery, the battery module, or the battery pack may be used as a power supply of the electrical device, or used as an energy storage unit of the electrical device. The electrical devices may include, but are not limited to, a mobile device (such as a mobile phone or a laptop computer), an electric vehicle (such as a battery electric vehicle, a hybrid electric vehicle, a plug-in hybrid electric vehicle, an electric bicycle, an electric scooter, an electric golf cart, or an electric truck), an electric train, a ship, a satellite system, or an energy storage system.

The secondary battery, the battery module, or the battery pack may be selected for use in the electrical device according to practical requirements of the electrical device.

Figure 7:
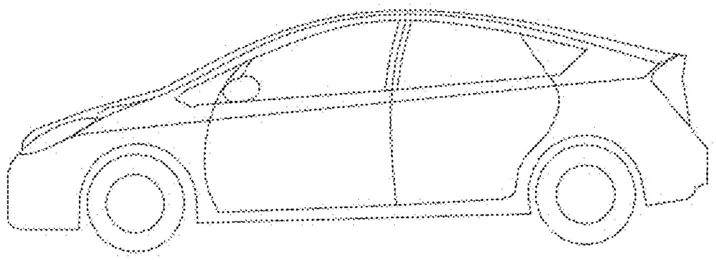
FIG. 7 is a schematic diagram of an electrical device that uses a secondary battery as a power supply according to an embodiment of this application.

FIG. 7 shows an electrical device as an example. The electrical device may be a battery electric vehicle, a hybrid electric vehicle, a plug-in hybrid electric vehicle, or the like. The electrical device may adopt a battery pack or a battery module in order to meet the requirements of the electrical device on a high power and a high energy density of the secondary battery.

EMBODIMENTS

The following describes some embodiments of this application. The embodiments described below are illustrative, and are merely intended to construe this application but not to limit this application. Unless techniques or conditions are otherwise expressly specified in an embodiment hereof, the techniques or conditions described in the literature in this field or in an instruction manual of the product are applicable in the embodiment. A reagent or instrument used herein without specifying a manufacturer is a conventional product that is commercially available in the market.

Embodiment 1

Precursors of large-particle and small-particle substrates of a high-nickel material are prepared by co-precipitation: Mixing $NiSO_4$, $CoSO_4$, and $Al(NO_3)_3$ at a ratio of 9:0.4:0.6 to obtain a mixed metal salt solution in which the salt concentration is 2 mol/L; and preparing a NaOH aqueous solution with a concentration of 4 mol/L and an ammonia aqueous solution with a concentration of 2 mol/L; adding pure water at a volume percent of 50% into the reactor; pumping the above three solutions into the reactor; setting the stirring speed to 800 r/min, and performing the reaction at a constant temperature of 40° C.; and adding a NaOH solution and an ammonia aqueous solution, adjusting the pH value in the reactor to 10; and keeping the reaction until a precursor product is synthesized. The volume distribution particle size $D_{v50}$ of the precursor product is 9.4 μm, and the particle distribution span of the product, denoted as $(D_{v90}-D_{v10})/D_{v50}$, is 0.9. Subsequently, performing centrifuging, washing, filtering, and drying on the product slurry to obtain a precursor product of a large-grained second ternary substrate.

The preparation method of the precursor of the first ternary substrate is similar to that of the precursor of the large-particle substrate except that in the metal salt solution of the small-particle substrate, the mixing ratio between Ni, Co, and Al is 9:0.7:0.3, and the pH value is controlled to be 13 during the co-precipitation reaction. The remaining reaction conditions remain unchanged. Keeping the reaction until a precursor product is synthesized, where the volume distribution particle size $D_{v50}$ of the product is 1.5 μm, and the particle size distribution span of the product, denoted as $(D_{v90}-D_{v10})/D_{v50}$, is 1.4. Subsequently, performing centrifuging, washing, filtering, and drying on the product slurry to obtain a precursor product of a first ternary substrate.

Mixing the precursor of the first ternary substrate with the precursor of the second ternary substrate at a mass ratio of 1:3, and then adding $LiOH \cdot H_2O$, and stirring in a plow mixer, where a total molar ratio between Li and Me in the aggregate of the $LiOH \cdot H_2O$ and the substrate precursor is 1.05, Me is a general term for Ni, Al, and M element, the sintering temperature is 800° C., the sintering time is 16 h, and the sintering atmosphere is $O_2$; sintering the mixture to obtain a ternary positive electrode material substrate with graded large and small particles, where the precursor of the first ternary substrate is sintered to form a first ternary substrate $Li_1[Ni_{0.9}Al_{0.03}Co_{0.07}]O_2$, and the precursor of the second ternary substrate is sintered to form a second ternary substrate $Li_1[Ni_{0.9}Al_{0.06}Co_{0.04}]O_2$.

Mixing the ternary positive electrode material substrate containing graded large and small particles with $Al_2O_3$, where the amount of $Al_2O_3$ added is 1000 ppm (based on the mass of the Al element); sintering the mixture at a sintering temperature of 600° C. in a sintering atmosphere of $O_2$ for a time of 8 hours to finally obtain a ternary positive electrode material coated with an Al layer and containing graded large and small particles, where the first ternary substrate is sintered to form a first positive electrode material, and the second ternary substrate is sintered to form a second positive electrode material.

Embodiment 2

Differences from Embodiment 1 are as follows:

In the preparation of the precursor of the second ternary substrate, the molar ratio between Ni, Co, and Al is set to 8.8:0.2:1, the pH value during the co-precipitation is set to 10.5, the particle size distribution span of the product, denoted as $(D_{v90}-D_{v10})/D_{v50}$, is 0.85, and the complexant is an aqueous solution of ammonium sulfate.

In the preparation of the precursor of the first ternary substrate, the molar ratio between Ni, Co, and Al is set to 8.8:0.7:0.5, the pH value during the co-precipitation is set to 14, the particle size distribution span of the product, denoted as $(D_{v90}-D_{v10})/D_{v50}$, is 1.6, and the complexant is an aqueous solution of ammonium sulfate.

In the preparation of the ternary positive electrode material substrate, the precursor of the first ternary substrate and the precursor of the second ternary substrate are mixed at a mass ratio of 1:2, $LiOH{\cdot}H_2O$ is replaced with $Li_2CO_3$, the molar ratio of Li to Me is set to 1.05, the sintering temperature is 850° C., and the sintering time is 12 h. The resultant products are a first ternary substrate $Li_1[Ni_{0.88}Al_{0.05}Co_{0.07}]O_2$ and a second ternary substrate $Li_1[Ni_{0.88}Al_{0.1}Co_{0.02}]O_2$.

In the preparation of the ternary positive electrode material, $Al_2O_3$ is replaced with $Al(OH)_3$, the amount of $Al(OH)_3$ added is 500 ppm (based on the mass of the Al element), the sintering temperature is 550° C., the sintering time is 6 h, and the sintering atmosphere is 02.

Embodiment 3

Differences from Embodiment 1 are as follows:

In the preparation of the precursor of the second ternary substrate, the molar ratio between Ni, Co, and Al is set to 8:0.5:1.5, the pH value during the co-precipitation is set to 9, the NaOH aqueous solution as a precipitant is replaced with a $Na_2CO_3$ aqueous solution, and the particle size distribution span of the product, denoted as $(D_{v90}-D_{v10})/D_{v50}$, is 0.9.

In the preparation of the precursor of the first ternary substrate, the molar ratio between Ni, Co, and Al is set to 8:1.2:0.8, the pH value during the co-precipitation is set to 11.5, the NaOH aqueous solution as a precipitant is replaced with a $Na_2CO_3$ aqueous solution, and the particle size distribution span of the product, denoted as $(D_{v90}-D_{v10})/D_{v50}$, is 1.8.

In the preparation of the ternary positive electrode material substrate, the precursor of the first ternary substrate and the precursor of the second ternary substrate are mixed at a mass ratio of 1:5, LiOH $H_2O$ is replaced with $CH_3COOLi$, the molar ratio of Li to Me is set to 1.05, the sintering temperature is 750° C., and the sintering time is 15 h. The resultant products are a first ternary substrate $Li_1[Ni_{0.8}Al_{0.08}Co_{0.12}]O_2$ and a second ternary substrate $Li_1[Ni_{0.8}Al_{0.15}Co_{0.05}]O_2$.

In the preparation of the ternary positive electrode material, $Al_2O_3$ is replaced with $AlCl_3$, the amount of $AlCl_3$ added is 800 ppm (based on the mass of the Al element), the sintering temperature is 650° C., the sintering time is 7 h, and the sintering atmosphere is 02.

Embodiment 4

Differences from Embodiment 1 are as follows:

In the preparation of the precursor of the second ternary substrate, the molar ratio between Ni, Co, and Al is set to 9.4:0.1:0.5, the pH value during the co-precipitation is set to 8, the NaOH aqueous solution as a precipitant is replaced with a $Na_2CO_3$ aqueous solution, and the particle size distribution span of the product, denoted as $(D_{v90}-D_{v10})/D_{v50}$, is 0.94.

In the preparation of the precursor of the first ternary substrate, the molar ratio between Ni, Co, and Al is set to 9.4:0.5:0.1, the precipitant is still the NaOH aqueous solution, the pH value during the co-precipitation is set to 12, and the particle size distribution span of the product, denoted as $(D_{v90}-D_{v10})/D_{v50}$, is 1.6.

In the preparation of the ternary positive electrode material substrate, the precursor of the first ternary substrate and the precursor of the second ternary substrate are mixed at a mass ratio of 1:4, $LiOH{\cdot}H_2O$ is replaced with $Li_2SO_4$, the molar ratio of Li to Me is set to 1.05, the sintering temperature is 720° C., and the sintering time is 12 h. The resultant products are a first ternary substrate $Li_1[Ni_{0.94}Al_{0.01}Co_{0.05}]O_2$ and a second ternary substrate $Li_1[Ni_{0.94}Al_{0.05}Co_{0.01}]O_2$.

In the preparation of the ternary positive electrode material, $Al_2O_3$ is replaced with $Al_2(CO_3)_3$, the amount of $Al_2(CO_3)_3$ added is 600 ppm (based on the mass of the Al element), the sintering temperature is 500° C., the sintering time is 5 h, and the sintering atmosphere is $O_2$.

Embodiment 5

Differences from Embodiment 1 are as follows:

In the preparation of the precursor of the second ternary substrate, $CoSO_4$ is replaced with $MgSO_4$, the pH value during the co-precipitation is set to 10.2, keeping the reaction until a precursor product is synthesized, where the volume distribution particle size $D_{v50}$ of the product is 9.3 μm, and the particle size distribution span of the product, denoted as $(D_{v90}-D_{v10})/D_{v50}$, is 0.8.

In the preparation of the precursor of the first ternary substrate, $CoSO_4$ is replaced with $MgSO_4$, the pH value during the co-precipitation is set to 11, keeping the reaction until a precursor product is synthesized, where the volume distribution particle size $D_{v50}$ of the product is 3 μm, and the particle size distribution span of the product, denoted as $(D_{v90}-D_{v10})/D_{v50}$, is 1.5.

The remaining conditions remain unchanged.

Embodiment 6

Differences from Embodiment 1 are as follows:

In the preparation of the precursor of the second ternary substrate, $CoSO_4$ is replaced with $Zr(NO_3)_4$, the pH value during the co-precipitation is set to 9.6, keeping the reaction until a precursor product is synthesized, where the volume distribution particle size $D_{v50}$ of the product is 9.6 μm, and the particle size distribution span of the product, denoted as $(D_{v90}-D_{v10})/D_{v50}$, is 1.

In the preparation of the precursor of the first ternary substrate, $CoSO_4$ is replaced with $Zr(NO_3)_4$, the pH value during the co-precipitation is set to 11.8, keeping the reaction until a precursor product is synthesized, where the volume distribution particle size $D_{v50}$ of the product is 2.1 μm, and the particle size distribution span of the product, denoted as $(D_{v90}-D_{v10})/D_{v50}$, is 1.7.

The remaining conditions remain unchanged.

Embodiment 7

Differences from Embodiment 1 are as follows:

In the preparation of the precursor of the second ternary substrate, $CoSO_4$ is replaced with $TiCl_4$, the pH value during the co-precipitation is set to 8.8, keeping the reaction until a precursor product is synthesized, where the volume distribution particle size $D_{v50}$ of the product is 10.1 μm, and the particle size distribution span of the product, denoted as $(D_{v90}-D_{v10})/D_{v50}$, is 0.95.

In the preparation of the precursor of the first ternary substrate, $CoSO_4$ is replaced with $TiCl_4$, the pH value during the co-precipitation is set to 11, keeping the reaction until a precursor product is synthesized, where the volume distribution particle size $D_{v50}$ of the product is 3 μm, and the particle size distribution span of the product, denoted as $(D_{v90}-D_{v10})/D_{v50}$, is 1.6.

The remaining conditions remain unchanged.

Embodiment 8

Differences from Embodiment 1 are as follows:

In the preparation of the precursor of the second ternary substrate, $CoSO_4$ is replaced with $W(SO_4)_3$, the pH value during the co-precipitation is set to 10.3, keeping the reaction until a precursor product is synthesized, where the volume distribution particle size $D_{v50}$ of the product is 9 μm, and the particle size distribution span of the product, denoted as $(D_{v90}-D_{v10})/D_{v50}$, is 0.85.

In the preparation of the precursor of the first ternary substrate, $CoSO_4$ is replaced with $W(SO_4)_3$, the pH value during the co-precipitation is set to 11, keeping the reaction until a precursor product is synthesized, where the volume distribution particle size $D_{v50}$ of the product is 3 μm, and the particle size distribution span of the product, denoted as $(D_{v90}-D_{v10})/D_{v50}$, is 1.5.

The remaining conditions remain unchanged.

Embodiment 9

Differences from Embodiment 1 are as follows:

In the preparation of the ternary positive electrode material substrate, the molar ratio between Li and Me is set to 1.15, and other conditions remain unchanged.

Embodiment 10

Differences from Embodiment 1 are as follows:

In the preparation of the ternary positive electrode material substrate, the molar ratio between Li and Me is set to 1.25, and other conditions remain unchanged.

Embodiment 11

Differences from Embodiment 1 are as follows:

The precursor of the first ternary substrate and the precursor of the second ternary substrate are mixed at a mass ratio of 1:1 instead.

Embodiment 12

Differences from Embodiment 1 are as follows:

The precursor of the first ternary substrate and the precursor of the second ternary substrate are mixed at a mass ratio of 1:10 instead.

Embodiment 13

Differences from Embodiment 1 are as follows:

The precursor of the first ternary substrate and the precursor of the second ternary substrate are mixed at a mass ratio of 1:7 instead.

Embodiment 14

Differences from Embodiment 1 are as follows:

In the preparation of the precursor, the pH value is controlled to be 11 during the co-precipitation reaction of the precursor of the first ternary substrate, the reaction temperature is controlled to be 60° C., and other reaction conditions remain unchanged.

During the sintering, the temperature of the first-time sintering is adjusted to 600° C., the sintering time of the first-time sintering is adjusted to 20 h, the temperature of the second-time sintering is adjusted to 400° C., and the sintering time of the second-time sintering is adjusted to 15 h.

Embodiment 15

Differences from Embodiment 1 are as follows:

In the preparation of the precursor, the pH value is controlled to be 14 during the co-precipitation reaction of the precursor of the first ternary substrate, the reaction temperature is controlled to be 30° C., and other reaction conditions remain unchanged.

During the sintering, the temperature of the first-time sintering is adjusted to 600° C., the sintering time of the first-time sintering is adjusted to 20 h, the temperature of the second-time sintering is adjusted to 400° C., and the sintering time of the second-time sintering is adjusted to 15 h.

Embodiment 16

Differences from Embodiment 1 are as follows:

In the preparation of the precursor, the pH value is controlled to be 11 during the co-precipitation reaction of the precursor of the first ternary substrate, the reaction temperature is controlled to be 80° C., and other reaction conditions remain unchanged.

During the sintering, the temperature of the first-time sintering is adjusted to 600° C., the sintering time of the first-time sintering is adjusted to 20 h, the temperature of the second-time sintering is adjusted to 400° C., and the sintering time of the second-time sintering is adjusted to 15 h.

Embodiment 17

Differences from Embodiment 1 are as follows:

In the preparation of the precursor, the pH value is controlled to be 10.5 during the co-precipitation reaction of the precursor of the second ternary substrate, the reaction temperature is controlled to be 30° C., and other reaction conditions remain unchanged.

During the sintering, the temperature of the first-time sintering is adjusted to 900° C., the sintering time of the first-time sintering is adjusted to 8 h, the temperature of the second-time sintering is adjusted to 450° C., and the sintering time of the second-time sintering is adjusted to 12 h.

Embodiment 18

Differences from Embodiment 1 are as follows:

In the preparation of the precursor, the pH value is controlled to be 8 during the co-precipitation reaction of the precursor of the second ternary substrate, the reaction temperature is controlled to be 70° C., and other reaction conditions remain unchanged.

During the sintering, the temperature of the first-time sintering is adjusted to 900° C., the sintering time of the first-time sintering is adjusted to 8 h, the temperature of the second-time sintering is adjusted to 450° C., and the sintering time of the second-time sintering is adjusted to 12 h.

Embodiment 19

Differences from Embodiment 1 are as follows:

In the preparation of the precursor, the pH value is controlled to be 10.5 during the co-precipitation reaction of the precursor of the second ternary substrate, the reaction temperature is controlled to be 50° C., and other reaction conditions remain unchanged.

During the sintering, the temperature of the first-time sintering is adjusted to 900° C., the sintering time of the first-time sintering is adjusted to 8 h, the temperature of the second-time sintering is adjusted to 450° C., and the sintering time of the second-time sintering is adjusted to 12 h.

Embodiment 20

Differences from Embodiment 1 are as follows:

In the preparation of the precursor, the pH value is controlled to be 8 during the co-precipitation reaction of the precursor of the second ternary substrate, the reaction temperature is controlled to be 80° C., and other reaction conditions remain unchanged.

During the sintering, the temperature of the first-time sintering is adjusted to 850° C., the sintering time of the first-time sintering is adjusted to 12 h, the temperature of the second-time sintering is adjusted to 700° C., and the sintering time of the second-time sintering is adjusted to 5 h.

Embodiment 21

Differences from Embodiment 1 are as follows:

In the preparation of the precursor, the pH value is controlled to be 10 during the co-precipitation reaction of the precursor of the second ternary substrate, the reaction temperature is controlled to be 45° C., and other reaction conditions remain unchanged.

During the sintering, the temperature of the first-time sintering is adjusted to 850° C., the sintering time of the first-time sintering is adjusted to 12 h, the temperature of the second-time sintering is adjusted to 700° C., and the sintering time of the second-time sintering is adjusted to 5 h.

Embodiment 22

Differences from Embodiment 1 are as follows:

In the preparation of the precursor, the pH value is controlled to be 10 during the co-precipitation reaction of the precursor of the second ternary substrate, the reaction temperature is controlled to be 55° C., and other reaction conditions remain unchanged.

During the sintering, the temperature of the first-time sintering is adjusted to 650° C., the sintering time of the first-time sintering is adjusted to 18 h, the temperature of the second-time sintering is adjusted to 650° C., and the sintering time of the second-time sintering is adjusted to 10 h.

Embodiment 23

Differences from Embodiment 1 are as follows:

In the preparation of the precursor, the pH value is controlled to be 10 during the co-precipitation reaction of the precursor of the second ternary substrate, the reaction temperature is controlled to be 60° C., and other reaction conditions remain unchanged.

During the sintering, the temperature of the first-time sintering is adjusted to 650° C., the sintering time of the first-time sintering is adjusted to 18 h, the temperature of the second-time sintering is adjusted to 650° C., and the sintering time of the second-time sintering is adjusted to 10 h.

Embodiment 24

Differences from Embodiment 1 are as follows:

In the preparation of the precursor, the pH value is controlled to be 13 during the co-precipitation reaction of the precursor of the first ternary substrate, the reaction temperature is controlled to be 35° C., and other reaction conditions remain unchanged.

During the sintering, the temperature of the first-time sintering is adjusted to 700° C., the sintering time of the first-time sintering is adjusted to 16 h, the temperature of the second-time sintering is adjusted to 550° C., and the sintering time of the second-time sintering is adjusted to 6 h.

Embodiment 25

Differences from Embodiment 1 are as follows:

In the preparation of the precursor, the pH value is controlled to be 13 during the co-precipitation reaction of the precursor of the first ternary substrate, the reaction temperature is controlled to be 45° C., and other reaction conditions remain unchanged.

During the sintering, the temperature of the first-time sintering is adjusted to 700° C., the sintering time of the first-time sintering is adjusted to 16 h, the temperature of the second-time sintering is adjusted to 550° C., and the sintering time of the second-time sintering is adjusted to 6 h.

Embodiment 26

Differences from Embodiment 1 are as follows:

During the sintering, no $Al_2O_3$ is added in the second-time sintering, and the remaining conditions remain unchanged.

Embodiment 27

Differences from Embodiment 1 are as follows:

During the sintering, $Al_2O_3$ is added in an amount of 2000 ppm (based on the mass of the Al element) in the second-time sintering, and the remaining conditions remain unchanged.

Embodiment 28

Differences from Embodiment 1 are as follows:

In the preparation of the precursor of the second ternary substrate, the molar ratio between Ni, Co, and Al is set to 9.2:0.5:0.3. In the preparation of the precursor of the first ternary substrate, the molar ratio between Ni, Co, and Al is set to 9.2:0.7:0.1.

Embodiment 29

Differences from Embodiment 1 are as follows:

In the preparation of the precursor of the second ternary substrate, the molar ratio between Ni, Co, and Al is set to 7.9:0.2:1.9. In the preparation of the precursor of the first ternary substrate, the molar ratio between Ni, Co, and Al is set to 8.5:1:0.5.

Embodiment 30

Differences from Embodiment 1 are as follows:

In the preparation of the precursor of the second ternary substrate, the molar ratio between Ni, Co, and Al is set to 7.5:0.5:2. In the preparation of the precursor of the first ternary substrate, the molar ratio between Ni, Co, and Al is set to 8.5:1:0.5.

Embodiment 31

Differences from Embodiment 1 are as follows:

In the preparation of the precursor of the second ternary substrate, the molar ratio between Ni, Co, and Al is set to 8.8:0.2:1. In the preparation of the precursor of the first ternary substrate, the molar ratio between Ni, Co, and Al is set to 9:0.7:0.3.

Embodiment 32

Differences from Embodiment 1 are as follows:

In the preparation of the precursor of the second ternary substrate, the molar ratio between Ni, Co, and Al is set to 8.5:0.2:1.3. In the preparation of the precursor of the first ternary substrate, the molar ratio between Ni, Co, and Al is set to 9:0.7:0.3.

Embodiment 33

Differences from Embodiment 1 are as follows:

In the preparation of the precursor of the second ternary substrate, the molar ratio between Ni, Co, and Al is set to 8.4:0.2:1.4. In the preparation of the precursor of the first ternary substrate, the molar ratio between Ni, Co, and Al is set to 9:0.7:0.3.

Embodiment 34

Differences from Embodiment 1 are as follows:

In the preparation of the precursor of the second ternary substrate, the molar ratio between Ni, Co, and Al is set to 8.3:0.2:1.5. In the preparation of the precursor of the first ternary substrate, the molar ratio between Ni, Co, and Al is set to 9:0.7:0.3.

Embodiment 35

In the preparation of the precursor of the second ternary substrate, the molar ratio between Ni, Co, and Al is set to 8.6:0.3:1.1. In the preparation of the precursor of the first ternary substrate, the molar ratio between Ni, Co, and Al is set to 9:0.7:0.3.

Embodiment 36

In the preparation of the precursor of the second ternary substrate, the molar ratio between Ni, Co, and Al is set to 8.4:0.3:1.3. In the preparation of the precursor of the first ternary substrate, the molar ratio between Ni, Co, and Al is set to 9:0.7:0.3.

Embodiment 37

In the preparation of the precursor of the second ternary substrate, the molar ratio between Ni, Co, and Al is set to 8.1:0.3:1.6. In the preparation of the precursor of the first ternary substrate, the molar ratio between Ni, Co, and Al is set to 9:0.7:0.3.

Embodiment 38

In the preparation of the precursor of the second ternary substrate, the molar ratio between Ni, Co, and Al is set to 7.8:0.2:2. In the preparation of the precursor of the first ternary substrate, the molar ratio between Ni, Co, and Al is set to 9:0.7:0.3. Comparative Embodiment 1

Differences from Embodiment 1 are as follows:

In the preparation of the precursor of the first ternary substrate, the molar ratio between Ni, Co, and Al is set to 9:0.7:0.3, the pH value during the co-precipitation is set to 10, the volume-based particle size $D_{v50}$ is 9.4 μm, the particle size distribution span of the product, denoted as $(D_{v90}-D_{v10})/D_{v50}$, is 0.9, and the remaining conditions remain unchanged.

Comparative Embodiment 2

Differences from Embodiment 1 are as follows:

In the preparation of the precursor of the first ternary substrate, the molar ratio between Ni, Co, and Al is set to 9:0.4:0.6, the volume-based particle size $D_{v50}$ is 1.5 μm, the particle size distribution span of the product, denoted as $(D_{v90}-D_{v10})/D_{v50}$, is 1.4, and the remaining conditions remain unchanged.

Performance Test

Particle Size Test

Testing the particle size distribution of the precursor product of the first ternary substrate, the precursor product of the second ternary substrate, and the resultant ternary positive electrode material by using a laser particle size analyzer (Malvern Mastersizer 3000), so as to obtain a volume-based particle size distribution curve of the precursor product of the first ternary substrate, a volume-based particle size distribution curve of the precursor product of the second ternary substrate, and a volume-based bimodal particle size distribution curve of large and small particles, where the first peak is $D_1$, and the second peak is $D_2$. Using Origin software to fit the bimodal distribution curve in a way that identifies each peak, so as to obtain a small-particle fitted peak and a large-particle fitted peak, where the small-particle fitted peak basically coincides with the volume-based particle size distribution curve of the precursor product of the first ternary substrate, and the large-particle fitted peak basically coincides with the volume-based particle size distribution curve of the precursor product of the second ternary substrate, indicating that the peak fitting result is reliable. Calculating the span $(D_{v90}+D_{v10})/D_{v50}$ of the two peaks based on the small-particle fitted peak and the large-particle fitted peak respectively.

Calculating the first peak $(D_1)^3$ and the second peak $(D_2)^3$ of the bimodal curve, and calculating a ratio between the two peaks. The calculation result shows that this ratio corresponds to the precursor ratio in the preparation process, indicating that it is reliable to calculate the mass ratio between the two materials by calculating the ratio of $(D_1)^3$ to $(D_2)^3$.

Test of Element Constituents of the Positive Electrode Material

Sticking the positive electrode material powder to a specimen holder, and placing the specimen holder into a vacuum chamber of the scanning electron microscope. Scanning the material powder by using a German ZEISS field emission scanning electron microscope (Sigma300), and observing the morphology of the surface of the material powder. Subsequently, scanning selected particles in an EDS mode to determine the types and content of the constituent elements. The SEM image of the ternary positive electrode material obtained in Embodiment 1 is shown in FIG. 1.

A specific test process is as follows: Testing 20 particles with a particle size that meets the $D_{v10}$ point of the bimodal curve in the positive electrode material based on the particle size analysis results, and calculating an average molar fraction of Al in the particles, denoted as Ali; testing 20 particles with a particle size that meets the $D_{v50}$ point of the bimodal curve in the positive electrode material, and calculating an average molar fraction of Al in the particles, denoted as $Al_2$; and testing 20 particles with a particle size that meets the $D_{v90}$ point of the bimodal curve in the positive electrode material, and calculating an average molar fraction of Al in the particles, denoted as $Al_3$. Testing 20 particles with a particle size that meets the first peak diameter in the positive electrode material, calculating an average molar fraction of Al in the particles, denoted as $Al_4$, and at the same time, calculating the volume of the particles in the positive electrode material, and calculating the mass percent $S_1$ of Al per unit volume of such particles in the positive electrode material. Testing 20 particles with a particle size that meets the second peak diameter in the positive electrode material, and calculating an average molar fraction of Al in the particles, denoted as $Al_5$, and at the same time, calculating the volume of the particles of the positive electrode material, and calculating the mass percent $S_2$ of Al per unit volume of such particles in the positive electrode material.

The test results are recorded in Table 1.

TABLE 1

| | $Al_1$ | $Al_2$ | $Al_3$ | $Al_4$ | $Al_5$ | $S_1$ | $S_2$ (%) | $D_1$ (μm) | $D_2$ (μm) |
|---|---|---|---|---|---|---|---|---|---|
| Embodiment 1 | 0.045 | 0.052 | 0.059 | 0.03 | 0.06 | 0.0575 | 0.000467 | 1.5 | 9.4 |
| Embodiment 2 | 0.062 | 0.082 | 0.097 | 0.05 | 0.1 | 0.3320 | 0.001299 | 1 | 8 |
| Embodiment 3 | 0.094 | 0.12 | 0.148 | 0.08 | 0.15 | 0.0432 | 0.000861 | 2.3 | 10.5 |
| Embodiment 4 | 0.028 | 0.041 | 0.049 | 0.01 | 0.05 | 0.0094 | 0.000192 | 1.8 | 12 |
| Embodiment 5 | 0.046 | 0.051 | 0.058 | 0.03 | 0.06 | 0.0072 | 0.000482 | 3 | 9.3 |
| Embodiment 6 | 0.047 | 0.052 | 0.059 | 0.03 | 0.06 | 0.0209 | 0.000439 | 2.1 | 9.6 |
| Embodiment 7 | 0.047 | 0.053 | 0.059 | 0.03 | 0.06 | 0.0072 | 0.000377 | 3 | 10.1 |
| Embodiment 8 | 0.044 | 0.053 | 0.057 | 0.03 | 0.06 | 0.0072 | 0.000532 | 3 | 9 |
| Embodiment 9 | 0.045 | 0.052 | 0.057 | 0.03 | 0.06 | 0.0575 | 0.000467 | 1.5 | 9.4 |
| Embodiment 10 | 0.046 | 0.051 | 0.059 | 0.03 | 0.06 | 0.0575 | 0.000467 | 1.5 | 9.4 |
| Embodiment 11 | 0.045 | 0.052 | 0.059 | 0.03 | 0.06 | 0.0575 | 0.000467 | 1.5 | 9.4 |
| Embodiment 12 | 0.045 | 0.052 | 0.059 | 0.03 | 0.06 | 0.0575 | 0.000467 | 1.5 | 9.4 |
| Embodiment 13 | 0.045 | 0.052 | 0.059 | 0.03 | 0.06 | 0.0575 | 0.000467 | 1.5 | 9.4 |
| Embodiment 14 | 0.031 | 0.056 | 0.059 | 0.03 | 0.06 | 0.0016 | 0.000467 | 5 | 9.4 |
| Embodiment 15 | 0.05 | 0.054 | 0.058 | 0.03 | 0.06 | 1.5520 | 0.000467 | 0.5 | 9.4 |
| Embodiment 16 | 0.024 | 0.055 | 0.057 | 0.03 | 0.06 | 0.0006 | 0.000467 | 7 | 9.4 |
| Embodiment 17 | 0.047 | 0.056 | 0.058 | 0.03 | 0.06 | 0.0575 | 0.001796 | 1.5 | 6 |
| Embodiment 18 | 0.052 | 0.054 | 0.058 | 0.03 | 0.06 | 0.0575 | 0.000067 | 1.5 | 18 |
| Embodiment 19 | 0.043 | 0.055 | 0.059 | 0.03 | 0.06 | 0.0575 | 0.003104 | 1.5 | 5 |
| Embodiment 20 | 0.056 | 0.057 | 0.059 | 0.03 | 0.06 | 0.0575 | 0.000049 | 1.5 | 20 |
| Embodiment 21 | 0.044 | 0.056 | 0.058 | 0.03 | 0.06 | 0.0575 | 0.000425 | 1.5 | 9.7 |
| Embodiment 22 | 0.043 | 0.057 | 0.059 | 0.03 | 0.06 | 0.0575 | 0.000377 | 1.5 | 10.1 |
| Embodiment 23 | 0.045 | 0.056 | 0.057 | 0.03 | 0.06 | 0.0575 | 0.000276 | 1.5 | 11.2 |
| Embodiment 24 | 0.041 | 0.055 | 0.058 | 0.03 | 0.06 | 0.0474 | 0.000467 | 1.6 | 9.4 |
| Embodiment 25 | 0.043 | 0.054 | 0.059 | 0.03 | 0.06 | 0.0283 | 0.000467 | 1.9 | 9.4 |
| Embodiment 26 | 0.045 | 0.052 | 0.059 | 0.03 | 0.06 | 0.0575 | 0.000467 | 1.5 | 9.4 |
| Embodiment 27 | 0.045 | 0.052 | 0.059 | 0.03 | 0.06 | 0.0575 | 0.000467 | 1.5 | 9.4 |
| Embodiment 28 | 0.005 | 0.022 | 0.027 | 0.01 | 0.03 | 0.019588 | 0.000239 | 1.5 | 9.4 |
| Embodiment 29 | 0.098 | 0.18 | 0.182 | 0.05 | 0.19 | 0.097942 | 0.001512 | 1.5 | 9.4 |
| Embodiment 30 | 0.111 | 0.188 | 0.193 | 0.05 | 0.2 | 0.097942 | 0.001592 | 1.5 | 9.4 |
| Embodiment 31 | 0.046 | 0.082 | 0.092 | 0.03 | 0.1 | 0.058765 | 0.000796 | 1.5 | 9.4 |
| Embodiment 32 | 0.73 | 0.103 | 0.12 | 0.03 | 0.13 | 0.058765 | 0.001035 | 1.5 | 9.4 |
| Embodiment 33 | 0.79 | 0.121 | 0.13 | 0.03 | 0.14 | 0.058765 | 0.001114 | 1.5 | 9.4 |
| Embodiment 34 | 0.82 | 0.140 | 0.148 | 0.03 | 0.15 | 0.058765 | 0.001194 | 1.5 | 9.4 |
| Embodiment 35 | 0.63 | 0.082 | 0.102 | 0.03 | 0.11 | 0.058765 | 0.000876 | 1.5 | 9.4 |
| Embodiment 36 | 0.71 | 0.089 | 0.123 | 0.03 | 0.13 | 0.058765 | 0.001035 | 1.5 | 9.4 |
| Embodiment 37 | 0.79 | 0.95 | 0.152 | 0.03 | 0.16 | 0.058765 | 0.001274 | 1.5 | 9.4 |
| Embodiment 38 | 10.84 | 0.11 | 0.181 | 0.03 | 0.2 | 0.058765 | 0.001592 | 1.5 | 9.4 |
| Comparative Embodiment 1 | 0.45 | 0.47 | 0.49 | 0.03 | 0.06 | 0.0575 | 0.000467 | 9.4 | 9.4 |
| Comparative Embodiment 2 | 0.06 | 0.06 | 0.06 | 0.06 | 0.06 | 0.115 | 0.000467 | 1.5 | 19.4 |

| | $(D_2)^3 \cdot S_2 > (D_1)^3 \cdot S_1$ | $D_2 - D_1 > D_1 \cdot (S_1/S_2)^{1/3}$ | $(D_{v90} - D_{v10})/D_{v50}$ Small-particle fitted peak | $(D_{v90} - D_{v10})/D_{v50}$ Large-particle fitted peak |
|---|---|---|---|---|
| Embodiment 1 | 0.00388 > 0.00194 | 7.9 > 0.004 | 1.4 | 0.9 |
| Embodiment 2 | 0.00665 > 0.00332 | 7 > 0.0013 | 1.6 | 0.85 |
| Embodiment 3 | 0.00997 > 0.00526 | 8.2 > 0.0153 | 1.8 | 0.9 |

TABLE 1-continued

| | | | | |
|---|---|---|---|---|
| Embodiment 4 | 0.00332 > 0.00055 | 10.2 > 0.0102 | 1.6 | 0.94 |
| Embodiment 5 | 0.00388 > 0.00194 | 6.3 > 0.067 | 1.5 | 0.8 |
| Embodiment 6 | 0.00388 > 0.00194 | 7.5 > 0.014 | 1.7 | 1 |
| Embodiment 7 | 0.00388 > 0.00194 | 7.1 > 0.052 | 1.6 | 0.95 |
| Embodiment 8 | 0.00388 > 0.00194 | 6 > 0.074 | 1.5 | 0.85 |
| Embodiment 9 | 0.00388 > 0.00194 | 7.9 > 0.004 | 1.4 | 0.9 |
| Embodiment 10 | 0.00388 > 0.00194 | 7.9 > 0.004 | 1.4 | 0.9 |
| Embodiment 11 | 0.00388 > 0.00194 | 7.9 > 0.004 | 1.4 | 0.9 |
| Embodiment 12 | 0.00388 > 0.00194 | 7.9 > 0.004 | 1.4 | 0.9 |
| Embodiment 13 | 0.00388 > 0.00194 | 7.9 > 0.004 | 1.4 | 0.9 |
| Embodiment 14 | 0.00388 > 0.00194 | 4.4 > 0.0133 | 2 | 0.9 |
| Embodiment 15 | 0.00388 > 0.00194 | 8.9 > 0.0013 | 1.4 | 0.9 |
| Embodiment 16 | 0.00388 > 0.00194 | 2.4 > 0.0187 | 1.7 | 0.9 |
| Embodiment 17 | 0.00388 > 0.00194 | 4.5 > 0.004 | 1.4 | 1 |
| Embodiment 18 | 0.00388 > 0.00194 | 16.5 > 0.004 | 1.4 | 0.81 |
| Embodiment 19 | 0.00388 > 0.00194 | 3.5 > 0.004 | 1.4 | 0.92 |
| Embodiment 20 | 0.00388 > 0.00194 | 18.5 > 0.004 | 1.4 | 0.8 |
| Embodiment 21 | 0.00388 > 0.00194 | 7.9 > 0.004 | 1.4 | 0.6 |
| Embodiment 22 | 0.00388 > 0.00194 | 7.9 > 0.004 | 1.4 | 0.2 |
| Embodiment 23 | 0.00388 > 0.00194 | 7.9 > 0.004 | 1.4 | 1.2 |
| Embodiment 24 | 0.00388 > 0.00194 | 7.9 > 0.004 | 1.2 | 0.9 |
| Embodiment 25 | 0.00388 > 0.00194 | 7.9 > 0.004 | 2.2 | 0.9 |
| Embodiment 26 | 0.00388 > 0.00194 | 7.9 > 0.004 | 1.4 | 0.9 |
| Embodiment 27 | 0.00388 > 0.00194 | 7.9 > 0.004 | 1.4 | 0.9 |
| Embodiment 28 | 0.001983 > 0.000661 | 7.9 > 0.345219 | 1.4 | 0.9 |
| Embodiment 29 | 0.012561 > 0.003306 | 7.9 > 0.373522 | 1.4 | 0.9 |
| Embodiment 30 | 0.013222 > 0.003306 | 7.9 > 0.379963 | 1.4 | 0.9 |
| Embodiment 31 | 0.006611 > 0.001983 | 7.9 > 0.357559 | 1.4 | 0.9 |
| Embodiment 32 | 0.008594 > 0.001983 | 7.9 > 0.390237 | 1.4 | 0.9 |
| Embodiment 33 | 0.009255 > 0.001983 | 7.9 > 0.399997 | 1.4 | 0.9 |
| Embodiment 34 | 0.009917 > 0.001983 | 7.9 > 0.409303 | 1.4 | 0.9 |
| Embodiment 35 | 0.007272 > 0.001983 | 7.9 > 0.369101 | 1.4 | 0.9 |
| Embodiment 36 | 0.008594 > 0.001983 | 7.9 > 0.390237 | 1.4 | 0.9 |
| Embodiment 37 | 0.010578 > 0.001983 | 7.9 > 0.418203 | 1.4 | 0.9 |
| Embodiment 38 | 0.013222 > 0.001983 | 7.9 > 0.450496 | 1.4 | 0.9 |
| Comparative Embodiment 1 | 0.00388 > 0.00194 | — | 0.9 | 0.9 |
| Comparative Embodiment 2 | 0.00388 = 0.00388 | 7.9 > 0.004 | 1.4 | 0.9 |

Method for Testing Residual Lithium

Acid-base titration method: Adding 30 grams of the positive electrode material into 100 mL pure water, stirring for 30 min, leaving the solution to stand for 5 min, suction-filtering the solution to produce a supernatant, taking 10 mL of the supernatant, and adding a hydrochloric acid standard solution with a concentration of 0.05 mol/L into the supernatant to titrate the lithium carbonate and lithium hydroxide dissolved out from the positive electrode material. Using a pH electrode as indicator electrode, determining an end point based on a sharp potential change, and calculating the residual lithium amount on the surface of the positive electrode material.

Preparing a Full-Cell

Using the ternary positive electrode material prepared in each embodiment as a positive electrode material, mixing the positive electrode material, acetylene black as a conductive agent, and polyvinylidene difluoride (PVDF) as a binder at mass ratio of 94:3:3 in an N-methylpyrrolidone solvent system, stirring well to obtain a slurry, applying the slurry onto an aluminum foil, and performing drying and cold-pressing to obtain a positive electrode plate. Mixing artificial graphite as a negative active material, hard carbon, acetylene black as a conductive agent, styrene-butadiene rubber (SBR) as a binder, and sodium carboxymethyl cellulose (CMC) as a thickener at a mass ratio 90:5:2:2:1 in a deionized water solvent system, stirring well to form a slurry. Applying the slurry onto a copper foil, and performing oven-drying and cold-pressing to obtain a negative electrode plate. Using a PE porous polymer film as a separator. Stacking the positive electrode plate, the separator, and the negative electrode plate sequentially, placing the separator between the positive electrode and the negative electrode to serve a function of separation, and winding the stacked structure to obtain a bare cell. Putting the bare cell into an outer package, injecting a prepared base electrolyte solution, and sealing the package to obtain a battery cell with a nominal capacity of 2.25 Ah.

Method for Testing the Initial Gravimetric Capacity of the Full-Cell

Leaving the full-cell to stand in a 25° C. constant-temperature environment for 5 minutes, discharging the full-cell at a current rate of 1/3C until the voltage reaches 2.8 V, leaving the full-cell to stand for 5 minutes, and charging the battery at 0.1C or 1/3C, respectively, until the voltage reaches 4.25 V. Subsequently, charging the full cell at a constant voltage of 4.25 V until the current is less than or equal to 0.05 mA indicating a full-charge state of the full-cell. Leaving the full-cell to stand for 5 minutes, and then discharging the full-cell at 0.1C or 1/3C correspondingly until the voltage reaches 2.8V. The ratio of the discharge capacity to the mass of the positive electrode material at this time is either the initial gravimetric capacity of the positive electrode material (at 0.1C) or the gravimetric capacity of the full-cell at 1/3C.

Testing the Cycle Performance of the Full-Cell

Charging the full-cell at a current rate of 1C in a 25° C. or 45° C. constant-temperature environment until the voltage reaches an upper limit 4.25 V within a voltage range of 2.8 V to 4.25 V, and then charging the full-cell at a constant voltage of 4.25 V until the current drops to 0.05 mA or below. Leaving the full cell to stand for 5 minutes, and then discharging the full-cell at a current of 1C until the voltage drops to 2.8 V, and recording the capacity at this time as $D_n$ (n=0, 1, 2 . . . ). Repeating the above operations for 150 cycles. $D_0$ is the initial capacity of the full-cell at 25° C. or 45° C., and $D_{150}$ is the remaining capacity of the full-cell that has been cycled for 150 cycles at 25° C. or 45° C.

Calculating the capacity retention rate of the cell charged and discharged at 25° C. or 45° C. for 150 cycles as: Capacity retention rate=$D_{150}/D_0$.

Testing the Swelling Rate of the Full-Cell at 70° C.

Storing a 100% SoC full-cell in a 70° C. constant-temperature oven for 30 days. Measuring the volume of the full-cell before and after storage (by a water displacement method). Recording the pre-storage volume and the post-storage volume as $V_1$ and $V_2$, respectively.

Calculating the swelling rate of the cell stored at 70° C. for 30 days as: swelling rate=$(V_2-V_1)$/nominal capacity of the cell (unit: mL/Ah).

The battery in each embodiment is prepared according to the above method, and performance metrics are measured. The test results are shown in Table 2 below.

TABLE 2

| | Amount of residual lithium (ppm) | Powder compaction density under a 5-ton pressure (g/cm$^3$) | Initial gravimetric capacity (mAh/g) | Gravimetric capacity of full-cell tested at ⅓ C (mAh/g) | Capacity after 150 cycles tested at 25° C. (%) | Capacity after 150 cycles tested at 45° C. (%) | Swelling rate of cell stored at 70° C. for 30 days (mL/Ah) |
|---|---|---|---|---|---|---|---|
| Embodiment 1 | 1864 | 3.74 | 228.4 | 216.2 | 94.3 | 90.4 | 4.86 |
| Embodiment 2 | 1783 | 3.62 | 225.1 | 213.5 | 95.1 | 90.8 | 5.06 |
| Embodiment 3 | 1936 | 3.7 | 219.4 | 208.5 | 95.8 | 91.2 | 4.73 |
| Embodiment 4 | 2116 | 3.71 | 230.1 | 219.5 | 93.1 | 89.7 | 6.81 |
| Embodiment 5 | 1875 | 3.67 | 226.9 | 215.6 | 93.6 | 89.1 | 6.04 |
| Embodiment 6 | 2231 | 3.68 | 227.2 | 216.1 | 93.7 | 89.6 | 7.81 |
| Embodiment 7 | 1964 | 3.65 | 228.1 | 217.7 | 93.9 | 89.8 | 7.26 |
| Embodiment 8 | 2551 | 3.66 | 227.9 | 217.5 | 93.1 | 89.1 | 5.93 |
| Embodiment 9 | 2547 | 3.72 | 225.7 | 216.9 | 93.5 | 89.2 | 5.83 |
| Embodiment 10 | 2691 | 3.73 | 226.9 | 217.3 | 93.6 | 89.8 | 6.71 |
| Embodiment 11 | 1972 | 3.61 | 226.1 | 216.5 | 93.2 | 88.6 | 5.26 |
| Embodiment 12 | 1836 | 3.60 | 227.2 | 217.1 | 93.1 | 88.6 | 5.38 |
| Embodiment 13 | 1845 | 3.61 | 227.3 | 216.8 | 93.9 | 89.2 | 4.91 |
| Embodiment 14 | 1935 | 3.6 | 227.6 | 216.2 | 93.2 | 88.8 | 5.43 |
| Embodiment 15 | 2017 | 3.71 | 227.1 | 216.9 | 92.9 | 88.4 | 6.39 |
| Embodiment 16 | 2236 | 3.63 | 227.2 | 216.7 | 90.1 | 83.5 | 8.46 |
| Embodiment 17 | 2183 | 3.71 | 227.8 | 216.5 | 92.8 | 88.6 | 5.91 |
| Embodiment 18 | 2076 | 3.69 | 226.8 | 216.7 | 93.1 | 89.1 | 5.37 |
| Embodiment 19 | 2014 | 3.67 | 227.4 | 216.1 | 89.4 | 82.1 | 8.91 |
| Embodiment 20 | 1948 | 3.69 | 227.2 | 216.3 | 90.3 | 83.7 | 9.21 |
| Embodiment 21 | 2381 | 3.72 | 226.8 | 216.1 | 93.8 | 89.1 | 5.02 |
| Embodiment 22 | 2301 | 3.71 | 226.9 | 217.1 | 90.2 | 83.5 | 8.37 |
| Embodiment 23 | 1935 | 3.7 | 227.1 | 217.4 | 89.9 | 82.7 | 9.02 |
| Embodiment 24 | 2011 | 3.69 | 227.1 | 217.2 | 89.8 | 82.4 | 9.14 |
| Embodiment 25 | 1924 | 3.71 | 227.3 | 216.9 | 90.5 | 83.9 | 8.26 |
| Embodiment 26 | 1935 | 3.73 | 227.5 | 216.6 | 92.6 | 88.1 | 6.52 |
| Embodiment 27 | 1834 | 3.74 | 227.5 | 217.2 | 93.7 | 89.2 | 5.62 |
| Embodiment 28 | 2018 | 3.69 | 218.7 | 206.5 | 88.6 | 82.3 | 8.26 |
| Embodiment 29 | 2173 | 3.67 | 216.9 | 204.7 | 87.9 | 81.9 | 9.32 |
| Embodiment 30 | 2281 | 3.68 | 215.3 | 203.6 | 86.3 | 78.9 | 10.47 |
| Embodiment 31 | 2079 | 3.64 | 216.7 | 204.2 | 86.1 | 78.4 | 10.59 |
| Embodiment 32 | 1937 | 3.65 | 215.9 | 203.7 | 87.3 | 79.5 | 10.36 |
| Embodiment 33 | 2028 | 3.71 | 216.2 | 204.1 | 87.8 | 80.1 | 9.18 |

TABLE 2-continued

| | Amount of residual lithium (ppm) | Powder compaction density under a 5-ton pressure (g/cm$^3$) | Initial gravimetric capacity (mAh/g) | Gravimetric capacity of full-cell tested at ⅓ C (mAh/g) | Capacity after 150 cycles tested at 25° C. (%) | Capacity after 150 cycles tested at 45° C. (%) | Swelling rate of cell stored at 70° C. for 30 days (mL/Ah) |
|---|---|---|---|---|---|---|---|
| Embodiment 34 | 2119 | 3.7 | 216.1 | 203.8 | 86.5 | 79.3 | 9.73 |
| Embodiment 35 | 2347 | 3.68 | 216.8 | 204.9 | 85.2 | 77.4 | 11.43 |
| Embodiment 36 | 2189 | 3.69 | 217.2 | 205.7 | 86.8 | 79.1 | 9.38 |
| Embodiment 37 | 2517 | 3.66 | 217.5 | 205.6 | 87.9 | 80.4 | 9.16 |
| Embodiment 38 | 2635 | 3.65 | 216.9 | 204.7 | 86.8 | 78.7 | 9.83 |
| Comparative Embodiment 1 | 2417 | 3.55 | 227.2 | 216.9 | 84.6 | 77.1 | 13.26 |
| Comparative Embodiment 2 | 2382 | 3.73 | 227.3 | 217.1 | 84.1 | 76.9 | 12.19 |

As can be seen from the results in Table 1 to Table 2, in contrast to Comparative Embodiment 1, on the one hand, the positive active material containing graded large and small particles in this application possesses a high compaction density, so that the battery possesses a high energy density. On the other hand, the positive active material containing graded large and small particles in this application varies in structural stability and cycle stability depending on the Al content in the particles of different particle sizes in the material. Embodiment 1 can ensure that the material maintains a relatively stable particle structure during cycling, and suppresses particle cracking, and improves the cycle performance. Therefore, compared with Embodiments 11, 12, and 13, Embodiment 1 provides an optimized ratio of grading between large particles and small particles, and achieves a higher compaction density. In Embodiment 16 compared with Embodiment 1, the particle size of the first ternary material is excessively large. Therefore, the difference in Al content can hardly stabilize the structure of different materials, so that the cycle performance is lower. In Embodiments 21 compared with Embodiment 1, the span value of the second ternary material exerts little effect on the performance of the material. Therefore, the performance difference between Embodiment 21 and Embodiment 1 is small. In Embodiments 17 to 20 versus Embodiment 1, the particle size of the second ternary material in Embodiments 19 and 20 is excessively small or excessively large, both leading to deteriorated synergistic effect of the remaining first ternary material and obviously insufficient effect in improving the cycle performance. As can be seen from Embodiments 21 to 25 versus other embodiments, the change in the particle size concentration of the first ternary material or the second ternary material also exerts an impact on improvement of the cycle performance. When the particle size concentration in Embodiments 23, 24, and 25 is excessively high or excessively low, the effect in improving the cycle performance is significantly weakened.

In addition, the Al coating amount in Embodiments 26 and 27 is different from that in Embodiment 1, and therefore, the cycle stability is slightly reduced. The cycle performance in Embodiment 26 is significantly reduced for lack of Al coating. This shows that the Al-containing compound coating of the positive active material that contains graded large and small particles in this application can further effectively prevent the electrolyte solution from reacting parasitically on the surface of the positive active material, thereby further improving the cycle performance and safety performance of the battery.

As can be seen from Embodiment 1 versus Embodiments 28 to 38, in Embodiment 30, the excessive Al content in the particles corresponding to the particle size $D_{v10}$ leads to a high Al content in small particles, and the nonuniform hardness of the material leads to cracking of large particles. In Embodiment 31, the Al content in the particles corresponding to the particle size $D_{v50}$ is insufficient, especially the Al content in small particles is high, so that the performance of the material fades rapidly. In Embodiment 34, the Al content in the particles corresponding to the particle size $D_{v50}$ is excessive, especially the Al content in large particles is excessively high, but the Ni content decreases, so that the specific capacity of the material is significantly decreased compared with Embodiment 1. In Embodiment 35, the Al content in the particles corresponding to the particle size $D_{v90}$ is insufficient, especially the Al content in large particles is low, so that the particles are prone to cracking and the material is prone to a decline in the cycle performance. In Embodiment 38, the Al content in the particles corresponding to the particle size $D_{v90}$ is excessive, especially the Al element is mainly concentrated in large particles, so that the cycle performance is significantly lower than that of Embodiment 1 although improved to some extent.

Although this application has been described with reference to exemplary embodiments, various improvements may be made to the embodiments without departing from the scope of this application, and some components described in the embodiments may be replaced with equivalents. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A positive electrode material, wherein the positive electrode material comprises a ternary positive electrode substrate and optionally a coating layer, the coating layer coats a surface of the ternary positive electrode substrate, the ternary positive electrode substrate comprises Li, Ni, Al, and an M element, and the M element comprises a combination of one or more of Mn, Co, Ti, Zr, W, Nb, Mo, Si, Mg, B, Cr, or Ta, and a volume-based particle size distribution of the positive electrode material is a bimodal distribution, a low-peak particle diameter in the bimodal distribution is a first peak diameter, a high-peak particle diameter in the bimodal distribution is a second peak diameter, an average mass percent of Al in positive electrode material particles with a particle size smaller than the first peak diameter is $m_1$, and an average mass percent of Al in positive electrode material particles with a particle size larger than the second peak diameter is $m_2$, satisfying: $m_1<m_2$, wherein an average molar fraction of Al in particles with a particle size matching a $D_{v10}$ point of the bimodal distribution in the positive electrode material is 0.005 to 0.1; wherein the bimodal distribution is fitted in a peak separation manner, so as to obtain a small-particle fitted peak and a large-particle fitted peak, a volume particle size distribution span of the large-particle fitted peak satisfies: $0.2\leq(D_{v90}-D_{v10})/D_{v50}\leq1$, and further optionally satisfies: $0.8<(D_{v90}-D_{v10})/D_{v50}\leq1$; and/or, a volume particle size distribution span of the small-particle fitted peak satisfies: $1.4\leq(D_{v90}-D_{v10})/D_{v50}\leq2$, and further optionally satisfies: $1.4\leq(D_{v90}-D_{v10})/D_{v50}\leq1.7$; and wherein the particles with a particle size that lies at the first peak diameter are defined as a small-grained particles of the positive electrode material, the particles with a particle size that lies at the second peak diameter are defined as a large-grained particles of the positive electrode material, and the average mass percent of Al in the small-grained particles of the positive electrode material is less than the average mass percent of Al in the large-grained particles of the positive electrode material;

wherein an average molar fraction of Al in particles with a particle size matching a $D_{v50}$ point of the bimodal distribution curve in the positive electrode material is 0.1 to 0.12; and/or, an average molar fraction of Al in particles with a particle size matching a $D_{v90}$ point of the bimodal distribution in the positive electrode material is 0.12 to 0.15.

2. The positive electrode material according to claim 1, wherein the first peak diameter falls between 0.5 μm and 5 μm, and optionally between 1 μm and 3 μm; and optionally, the second peak diameter falls between 6 μm and 18 μm, and optionally between 8 μm and 12 μm.

3. The positive electrode material according to claim 1, wherein a mass percent of Al in the small-grained particles per unit volume of the positive electrode material is defined as $S_1$, a mass percent of Al in the large-grained particles per unit volume of the positive electrode material is defined as $S_2$, the first peak diameter is defined as $D_1$, and the second peak diameter is defined as $D_2$, satisfying: $(D_1)^3\times S_1<(D_2)_3\times S_2$, and/or, a bimodal peak position difference satisfies $D_2-D_1>D_1\times(S_1/S_2)^{1/3}$.

4. The positive electrode material according to claim 1, wherein the positive electrode material comprises:

a first positive electrode material, wherein the first positive electrode material comprises a first ternary positive electrode substrate and optionally a first coating layer, the first coating layer coats a surface of the first ternary positive electrode substrate, and a chemical formula of the first ternary positive electrode substrate is $Li_{a1}[Ni_{x1}Al_{y1}M_{z1}]O_2$, wherein $0.6\leq x1<1, 0<y1\leq0.1, 0<z1<0.4, 1.0\leq a1\leq1.2$, and optionally, $0.8\leq x1<1, 0<y1<0.05$, and $x1/y1=10$ to 100; and a second positive electrode material, wherein the second positive electrode material comprises a second ternary positive electrode substrate and optionally a second coating layer, the second coating layer coats a surface of the second ternary positive electrode substrate, and a chemical formula of the second ternary positive electrode substrate is $Li_{a2}[Ni_{x2}Al_{y2}M_{z2}]O_2$, wherein $0.6\leq x2<1, 0.05\leq y2<0.4, 0<z2\leq0.35, 1.0\leq a2\leq1.2$, optionally, $0.8\leq x2<1, 0.05\leq y2<0.15$, and $x2/y2=4$ to 20, wherein M in the first positive electrode material and M in the second positive electrode material each independently comprise a combination of one or more of Mn, Co, Ti, Zr, W, Nb, Mo, Si, Mg, B, Cr, or Ta.

5. The positive electrode material according to claim 4, wherein $y1/z1=0.01$ to 1, optionally 0.2 to 0.75; and $y2/z2=0.5$ to 10, optionally 1 to 5.

6. The positive electrode material according to claim 4, wherein a volume particle size distribution of the first positive electrode material matches characteristics of the small-particle fitted peak; and a volume particle size distribution of the second positive electrode material matches characteristics of the large-particle fitted peak.

7. The positive electrode material according to claim 4, wherein, a mass ratio of the first positive electrode material to the second positive electrode material is 1:1 to 1:10, and optionally 1:2 to 1:5.

8. The positive electrode material according to claim 4, wherein the first positive electrode material comprises a first coating layer, and/or the second positive electrode material comprises a second coating layer, the first coating layer and the second coating layer each independently comprise an Al-containing compound; optionally, a coating amount of Al in the positive electrode material is 200 to 2000 ppm, and further optionally 500 to 1000 ppm.

9. The positive electrode material according to claim 1, wherein a powder compaction density of the positive electrode material under a 5-ton pressure is greater than or equal to 3.5 $g/cm^3$.

10. A method for preparing the positive electrode material according to claim 1, wherein the preparation method comprises:

preparing a first ternary material precursor and a second ternary material precursor each containing an Al element and an M element, wherein an aluminum content in the first ternary material precursor is less than an aluminum content in the second ternary material precursor, and a particle size of the first ternary material precursor is smaller than a particle size of the second ternary material precursor;

mixing the first ternary material precursor, the second ternary material precursor, and a lithium salt at a specified ratio to form a precursor mixture, and sintering the precursor mixture for a first time in an oxygen-containing atmosphere to obtain a substrate mixture of a first ternary positive electrode substrate and a second ternary positive electrode substrate; and optionally, mixing the substrate mixture with a coating layer feedstock, and then sintering the mixture for a second time in an oxygen-containing atmosphere to obtain the positive electrode material.

11. The preparation method according to claim 10, wherein a process of preparing the first ternary material precursor or the second ternary material precursor comprises:

mixing a Ni salt solution, an Al salt solution, and an M salt solution at a specified ratio to form a mixed salt solution;

feeding the mixed salt solution, a precipitant, and a complexant into a reactor, controlling a pH value and a reaction temperature of materials in the reactor to perform a co-precipitation reaction to obtain a product system, wherein the reaction temperature is 30° C. to 80° C.; during preparation of the first ternary material precursor, the pH value is denoted as pH1, and the pH1 is 11 to 14; during preparation of the second ternary material precursor, the pH value is denoted as pH2, and the pH2 is 8 to 10.5; and separating a solid substance from the product system to obtain the first ternary material precursor or the second ternary material precursor.

12. The preparation method according to claim 11, wherein the Ni salt and the M salt each independently comprise one or more of a sulfate salt, a nitrate salt, an oxalate salt, or a chloride; and/or, the Al salt is a mixture of one or more of a sulfate salt, a nitrate salt, an oxalate salt, a metaaluminate salt, or a chloride; optionally, a total concentration of the Ni salt, the Al salt, and the M salt in the mixed salt solution is 0.1 to 10 mol/L; and/or, the precipitant comprises an aqueous solution containing one or more of sodium hydroxide, sodium carbonate, potassium carbonate, or potassium hydroxide, and optionally a concentration of the precipitant is 0.1 to 20 mol/L; and/or, the complexant comprises an aqueous solution containing one or more of ammonia water, ammonium chloride, ammonium sulfate, urea, citric acid, or EDTA, and optionally a concentration of the complexant is 0.1 to 10 mol/L.

13. The preparation method according to claim 11, wherein the lithium salt comprises one or more of $LiOH{\cdot}H_2O$, $Li_2CO_3$, $Li_2SO_4$, $LiNO_3$, $LiC_2O_4$, or $CH_3COOLi$; optionally, a molar ratio of lithium to a metal Me in the precursor mixture is 1.0 to 1.2, and Me comprises Ni, Al, and the M element; optionally, a sintering temperature of the first-time sintering is 600° C. to 900° C., optionally 720° C. to 880° C.; and/or, a sintering time of the first-time sintering is 8 to 20 hours, optionally 12 to 16 hours; and/or, the oxygen-containing atmosphere in the first-time sintering is an air atmosphere or an $O_2$ atmosphere.

14. The preparation method according to claim 11, wherein the coating layer feedstock comprises one or more of $Al_2O_3$, $Al_2(SO_4)_3$, $AlCl_3$, $Al(NO_3)_3$, $Al_2(CO_3)_3$, $Al(OH)_3$, $NaAlO_2$, or $KAlO_2$; optionally, a particle size of the coating layer feedstock is 5 nm to 500 nm, and further optionally 100 nm to 300 nm; optionally, based on a coating amount of Al, a content of the coating layer feedstock relative to the substrate mixture is 200 to 2000 ppm, and further optionally 500 to 1000 ppm.

15. The preparation method according to claim 11, wherein a sintering temperature of the second-time sintering is 400° C. to 700° C., optionally 500° C. to 650° C.; and/or, a sintering time of the second-time sintering is 5 to 15 hours, optionally 5 to 10 hours; and/or, the oxygen-containing atmosphere in the second-time sintering is an air atmosphere or an $O_2$ atmosphere.

16. A secondary battery comprising a positive electrode plate, a negative electrode plate, a separator, and an electrolyte solution, wherein the positive electrode plate comprises a current collector and a positive electrode film layer, wherein the positive electrode film layer comprises a positive active material, and the positive active material is the positive electrode material according to claim 1.

17. An electrical device, comprising a secondary battery, wherein the secondary battery comprises the secondary battery according to claim 16.

* * * * *